US010783252B2

(12) United States Patent
Li et al.

(10) Patent No.: US 10,783,252 B2
(45) Date of Patent: Sep. 22, 2020

(54) SYSTEM AND METHOD FOR BOOTING WITHIN A HETEROGENEOUS MEMORY ENVIRONMENT

(71) Applicant: QUALCOMM Incorporated, San Diego, CA (US)

(72) Inventors: Yanru Li, San Diego, CA (US); Azzedine Touzni, Carlsbad, CA (US); Dexter Chun, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 81 days.

(21) Appl. No.: 16/107,956

(22) Filed: Aug. 21, 2018

(65) Prior Publication Data

US 2019/0065752 A1 Feb. 28, 2019

Related U.S. Application Data

(60) Provisional application No. 62/549,057, filed on Aug. 23, 2017.

(51) Int. Cl.
*G06F 9/00* (2006.01)
*G06F 15/177* (2006.01)
(Continued)

(52) U.S. Cl.
CPC .......... *G06F 21/575* (2013.01); *G06F 1/3206* (2013.01); *G06F 1/3275* (2013.01);
(Continued)

(58) Field of Classification Search
CPC .................................................... G06F 21/575
See application file for complete search history.

(56) References Cited

U.S. PATENT DOCUMENTS 6,397,317 B1 * 5/2002 Kusutaki ............. G06F 12/0638
711/102
2007/0136544 A1 * 6/2007 Oda .................... G06F 13/4243
711/167
(Continued)

FOREIGN PATENT DOCUMENTS

WO 2016175960 A1 11/2016

OTHER PUBLICATIONS

International Search Report and Written Opinion—PCT/US2018/047421—ISA/EPO—dated Nov. 26, 2018, 24 pages.
(Continued)

*Primary Examiner* — Mohammed H Rehman
(74) *Attorney, Agent, or Firm* — The Marbury Law Group, PLLC

(57) ABSTRACT

System and methods for booting a system-on-chip (SOC) in an enhanced memory mode are described herein. In one aspect, an enhanced memory mode indicator may be read to create a trusted channel to a non-volatile random-access memory (NVRAM). The NVRAM may be logically connected to the SOC. In an aspect, the NVRAM may be secured prior to the creation of the trusted channel. Once the secure channel to NVRAM has been created, the SOC may operate in an enhanced memory mode. Prior to the SOC powering down, the system may store an indicator operable to enable a subsequent boot of the SOC in the power saving mode. The SOC may be operable to switch between the power saving mode and a normal mode depending on the operational requirements of the portable computing device in which the SOC is implemented.

20 Claims, 10 Drawing Sheets

(51) Int. Cl.
*G06F 21/57* (2013.01)
*G06F 9/445* (2018.01)
*G06F 9/4401* (2018.01)
*G06F 21/51* (2013.01)
*G06F 1/3206* (2019.01)
*G06F 1/3234* (2019.01)
*G06F 1/3296* (2019.01)
*G06F 15/78* (2006.01)

(52) U.S. Cl.
CPC .......... *G06F 1/3296* (2013.01); *G06F 9/4401* (2013.01); *G06F 9/4403* (2013.01); *G06F 9/4418* (2013.01); *G06F 9/44557* (2013.01); *G06F 9/44573* (2013.01); *G06F 9/44578* (2013.01); *G06F 15/781* (2013.01); *G06F 21/51* (2013.01)

(56) References Cited

U.S. PATENT DOCUMENTS

| | | | |
|---|---|---|---|
| 2014/0047251 | A1 | 2/2014 | Kottilingal et al. |
| 2014/0068240 | A1* | 3/2014 | Nightingale ........ G06F 9/44557 713/2 |
| 2015/0026538 | A1* | 1/2015 | Sakai .................. G06F 11/1076 714/764 |
| 2017/0185781 | A1* | 6/2017 | Kim ...................... G06F 21/575 |

OTHER PUBLICATIONS

Kan Z., et al., "Energy-efficient In-memory Paging for Smartphones," IEEE Transactions on Computer Aided Design of Integrated Circuits and Systems, vol. 35 (10), Oct. 1, 2016, pp. 1577-1590, XP011622418, ISSN: 0278-0070, DOI: 10.1109/TCAD.2015. 2512904, [retrieved on Sep. 8, 2016].

Wang C., et al., "Power Estimation for Mobile Applications with Profile-driven Battery Traces," Low Power Electronics and Design, IEEE Press, 445 Hoes Lane, PO Box 1331, Piscataway, NJ 08855-1331, USA, Sep. 4, 2013, pp. 120-125, XP058056370, DOI: 10.1109/ISLPED.2013.6629277, ISBN: 978-1-4799-1235-3.

\* cited by examiner

SYSTEM AND METHOD FOR BOOTING WITHIN A HETEROGENEOUS MEMORY ENVIRONMENT

RELATED APPLICATIONS

This application claims the benefit of priority to U.S. Provisional Application No. 62/549,057, entitled "System And Method For Booting Within A Heterogeneous Memory" filed Aug. 23, 2017, the entire contents of which are hereby incorporated by reference.

BACKGROUND

Many portable computing devices are powered by complex system on chips (SOCs), many of which contain various logical and functional blocks related to the use and operation of the device. Such portable computing devices may have power constraints that make certain use cases infeasible due to the demands related to power. For example, many portable computing devices, such as smartphones, operate on a fixed battery, which has physical limitations relating to both capacity and peak output. To handle the ever-increasing performance demands by users on portable computing devices, innovative approaches must be developed to accommodate user performance demands without exceeding the power constraints of the portable computing device. One example of users demanding superior device performance is with respect to the latency of a device boot, whether it is the initial or subsequent boot (sometimes called a restart or wake).

With unlimited resources, it would be possible to design a portable computing device that could have nothing but leading-edge components, all of which providing optimal performance and power. However, the current market requires that portable computing device manufacturers find a balance between employing electronic components that are cost-effective while still providing an adequate user experience with respect to power and performance. With the increasing development of non-volatile random-access memory (NVRAM), some portable computing device manufacturers are seeking to leverage the advantages of NVRAM within systems that use more traditional components throughout the SOC. Since NVRAM is relatively newer than other existing RAM architectures, the cost of NVRAM may be cost-prohibitive to use throughout the device. Further, the characteristics of NVRAM may not be suitable for pervasive use in all portable computing devices of the future. For example, one potential drawback to NVRAM is that data stored within the NVRAM may need additional security, since the data may remain after the device has powered down.

Accordingly, there is a need for improved systems and methods for providing selective use of NVRAM within a portable computing device such that the operation of the portable computing device provides a satisfactory user experience without adversely impacting the cost to manufacture the portable computing. Further, the use of the NVRAM with respect to boot may improve user experience with respect to power and performance related to the portable computing device.

SUMMARY

A system and a method for booting a system-on-chip (SOC) in an enhanced memory mode (e.g., power saving mode, etc.) are described herein. The system and method may include reading an enhanced memory mode indicator, creating a trusted channel to a non-volatile random-access memory (NVRAM), where the NVRAM is logically connected to the SOC. Further, the NVRAM may be secured prior to the creation of the trusted channel. Then, the SOC may be operated in an enhanced memory mode and store an indicator operable to enable a subsequent boot (e.g., reboot) of the SOC in the power saving mode. In one aspect, the enhanced memory mode indicator (or power saving mode indicator) is a flag stored in a power management controller. In another aspect, the power saving mode indicator may be sent to the SOC from a device external to the SOC.

In one aspect, the system and method may receive an exception, where the exception indicates the SOC may exit power saving mode and operate in a normal mode. In another aspect, the trusted boot program may securely determine the presence of the power saving mode indicator. In yet another aspect, the operating of the SOC in the power saving mode may further include operations that load a software image from a storage memory into the NVRAM, where the software image is configured to execute within the NVRAM. In still another aspect, the software image may be a subset of a plurality of software images stored on the storage device, and the plurality of software images may provide substantially alternative functionality than the software image operating in the power saving mode. In another aspect, a processor may execute the method within the system. One of skill in the art will appreciate that the processor may be a digital signal processor (DSP), a graphics processing unit (GPU), a central processing unit (CPU), or an application-specific integrated circuit (ASIC). Further, the system and method may be incorporated within a portable computing device, which includes several logical and physical blocks of functionality within and without the SOC itself.

Various aspects may include methods of operating a computing system/device (e.g., SOC), which may include determining whether a software application program is a candidate for an enhanced memory mode, loading the software application program into NVRAM and setting an enhanced memory mode indicator operable to enable a subsequent boot of the computing device in the enhanced memory mode in response to determining that the software application program is a candidate for the enhanced memory mode, determining whether the enhanced memory mode indicator is set after rebooting the computing device, and operating the computing device in the enhanced memory mode by commencing execution of the software application program from the NVRAM in response to determining that the enhanced memory mode indicator is set. In an aspect, the method may include loading the software application program into volatile memory (e.g., DRAM, SRAM, etc.) in response to determining that the software application program is not a candidate for the enhanced memory mode, and commencing execution of the software application program from the volatile memory in response to determining that the enhanced memory mode indicator is not set.

In a further aspect, determining whether the software application program is a candidate for the enhanced memory mode may include evaluating the software application program to generate evaluation results, determining whether the software application program would benefit from rapid bootup, rapid state-changes, low-power device operation, or high-speed code execution based on the evaluation results, and determining that the software application program is a candidate for the enhanced memory mode in response to determining that the software application program would benefit from rapid bootup, rapid state-changes, low-power device operation, or high-speed code execution.

In a further aspect, determining whether the software application program is a candidate for the enhanced memory mode may include determining a size value for the software application program, determining a power consumption value for the software application program, determining a boot time value for the software application program, determining an expense metric value based on the size value, the power consumption value, and the boot time value, determining whether the expense metric value exceeds a threshold value, determining that the software application program is not a candidate for the enhanced memory mode in response to determining that the expense metric value exceeds the threshold value, and determining that the software application program is a candidate for the enhanced memory mode in response to determining that the expense metric value does not exceed the threshold value.

In a further aspect, the method may include identifying a plurality of candidate software application programs, categorizing each of identified software application programs into one or more categories, determining a worthiness value for each of the identified software application programs based on the one or more categories associated with each identified software application program, and inserting one or more of the identified software application programs into a list of candidate software application programs based on their respective worthiness values, in which determining whether the software application program is a candidate for the enhanced memory mode may include determining whether the software application program is a candidate for operating in the enhanced memory mode based on information included in the list of candidate software application programs.

In a further aspect, inserting one or more of the identified software application programs into the list of candidate software application programs based on their respective worthiness values may include inserting the identified software application programs into an ordered list of candidate software application programs that organizes the identified software application programs based on their associated worthiness values. In a further aspect, inserting one or more of the identified software application programs into the list of candidate software application programs based on their respective worthiness values may include determining whether the worthiness value associated with an identified software application program exceeds a threshold value, and inserting the identified software application program into the list of candidate software application programs in response to determining that the worthiness value associated with the identified software application program exceeds the threshold value.

In a further aspect, determining whether the software application program is a candidate for operating in the enhanced memory mode based on information included in the list of candidate software application programs may include determining whether the software application program is included in the list of candidate software application programs. In a further aspect, setting the enhanced memory mode indicator operable to enable the subsequent boot of the computing device in the enhanced memory mode may include storing a flag in a non-volatile memory. In a further aspect, setting the enhanced memory mode indicator operable to enable the subsequent boot of the computing device in the enhanced memory mode may include setting one of a low power mode indicator, a rapid boot time mode indicator, a rapid state-transition mode indicator, or a high-speed execution mode indicator.

In a further aspect, determining whether the enhanced memory mode indicator is set after rebooting the computing device may include executing a trusted boot program to securely determine a presence of the enhanced memory mode indicator. In a further aspect, the method may include sending the enhanced memory mode indicator to a system-on-chip of the computing device from a component external to the system-on-chip. In a further aspect, the method may include receiving an exception indicating that the computing device should exit the enhanced memory mode, and operating the computing device in a non-enhanced memory mode in response to receiving the exception.

In a further aspect, loading the software application program into the NVRAM may include loading a software image from a storage memory into the NVRAM, the software image being configured to execute within the NVRAM.

In a further aspect, the method may include partitioning the software application program into a plurality of software images, in which loading the software application program into the NVRAM may include loading a subset of the plurality of software images into the NVRAM.

In a further aspect, the method may include identifying a software image in the plurality of software images that would benefit most from improvements associated with execution in NVRAM, in which loading the subset of the plurality of software images into the NVRAM may include loading the identified software image into the NVRAM.

Further aspects may include a computing device that includes a NVRAM, and a processor coupled to the NVRAM, in which the processor may be configured with processor-executable instructions to perform operations that may include determining whether a software application program is a candidate for an enhanced memory mode, loading the software application program into the NVRAM and setting an enhanced memory mode indicator operable to enable a subsequent boot of the computing device in the enhanced memory mode in response to determining that the software application program is a candidate for the enhanced memory mode, determining whether the enhanced memory mode indicator is set after rebooting the computing device, and operating the computing device in the enhanced memory mode by commencing execution of the software application program from the NVRAM in response to determining that the enhanced memory mode indicator is set. In an aspect, the processor may be configured with processor-executable instructions to perform operations further including loading the software application program into volatile memory in response to determining that the software application program is not a candidate for the enhanced memory mode, and commencing execution of the software application program from the volatile memory in response to determining that the enhanced memory mode indicator is not set.

In a further aspect, the processor may be configured with processor-executable instructions to perform operations such that determining whether the software application program is a candidate for the enhanced memory mode includes determining a size value for the software application program, determining a power consumption value for the software application program, determining a boot time value for the software application program, determining an expense metric value based on the size value, the power consumption value, and the boot time value, determining whether the expense metric value exceeds a threshold value, determining that the software application program is not a candidate for the enhanced memory mode in response to determining that the expense metric value exceeds the threshold value, and determining that the software application program is a candidate for the enhanced memory mode in response to determining that the expense metric value does not exceed the threshold value.

Further aspects may include a computing device that includes means for determining whether a software application program is a candidate for an enhanced memory mode, means for loading the software application program into NVRAM and setting an enhanced memory mode indicator operable to enable a subsequent boot of the computing device in the enhanced memory mode in response to determining that the software application program is a candidate for the enhanced memory mode, means for determining whether the enhanced memory mode indicator is set after rebooting the computing device, and means for operating the computing device in the enhanced memory mode by commencing execution of the software application program from the NVRAM in response to determining that the enhanced memory mode indicator is set. In an aspect, the computing device may include means for loading the software application program into volatile memory in response to determining that the software application program is not a candidate for the enhanced memory mode, and means for commencing execution of the software application program from the volatile memory in response to determining that the enhanced memory mode indicator is not set.

In a further aspect means for determining whether the software application program is a candidate for the enhanced memory mode may include means for determining a size value for the software application program, means for determining a power consumption value for the software application program, means for determining a boot time value for the software application program, means for determining an expense metric value based on the size value, the power consumption value, and the boot time value, means for determining whether the expense metric value exceeds a threshold value, means for determining that the software application program is not a candidate for the enhanced memory mode in response to determining that the expense metric value exceeds the threshold value, and means for determining that the software application program is a candidate for the enhanced memory mode in response to determining that the expense metric value does not exceed the threshold value.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1:
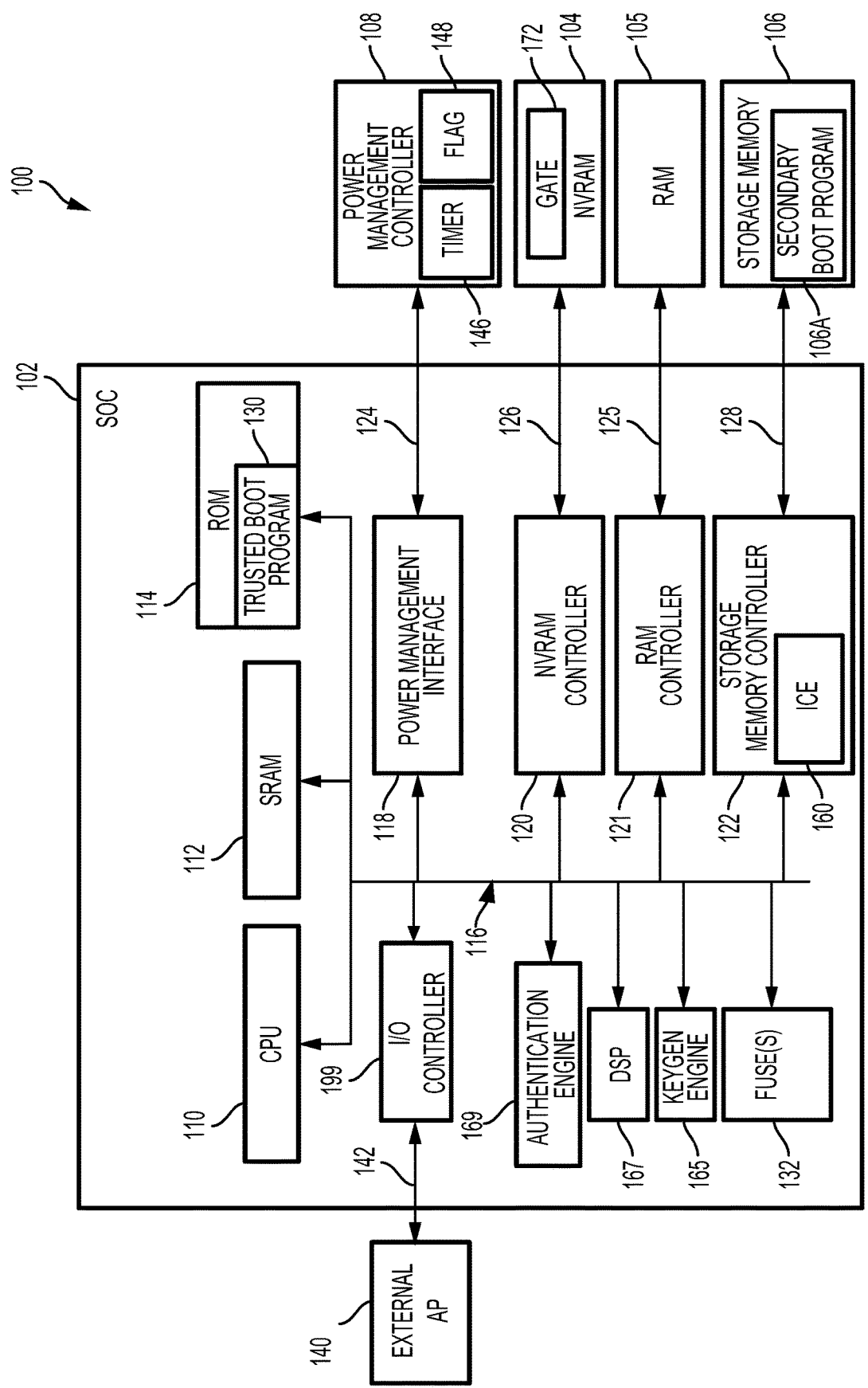
FIG. 1 illustrates a block diagram of a system operable to being booted in a normal mode or an enhanced memory mode.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

The terms "mobile device," "mobile computing device" and "portable computing device" may be used herein to refer to any one or all of cellular telephones, smartphones, personal or mobile multi-media players, personal data assistants (PDA's), laptop computers, tablet computers, smartbooks, netbooks, ultrabooks, palm-top computers, wireless electronic mail receivers, multimedia Internet enabled cellular telephones, wireless gaming controllers, Internet of Things (IoT) devices, wearable devices, hand-held computers, and similar personal electronic devices which include a programmable processor, memory, and/or communication circuitry for sending and receiving information via wired or wireless communication links or technologies.

As used in this application, the terms "component," "module," "system," "engine," and the like are intended to include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a computing device and the computing device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known network, computer, processor, and/or process related communication methodologies.

The term "system on chip" (SOC) is used herein to refer to a single integrated circuit (IC) chip that contains multiple resources, processors and/or processing cores integrated on a single substrate. A single SOC may contain circuitry for digital, analog, mixed-signal, and radio-frequency functions.

A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

A number of different types of memories and memory technologies are available or contemplated in the future, any or all of which may be included and used in systems and computing devices that implement the various embodiments. Such memory technologies/types may include non-volatile random-access memories (NVRAM) such as Magnetoresistive RAM (M-RAM), resistive random access memory (ReRAM or RRAM), phase-change random-access memory (PC-RAM, PRAM or PCM), ferroelectric RAM (F-RAM), spin-transfer torque magnetoresistive random-access memory (STT-MRAM), and three-dimensional cross point (3D-XPOINT) memory. Such memory technologies/types may also include non-volatile or read-only memory (ROM) technologies, such as programmable read-only memory (PROM), field programmable read-only memory (FPROM), one-time programmable non-volatile memory (OTP NVM). Such memory technologies/types may further include volatile random-access memory (RAM) technologies, such as dynamic random-access memory (DRAM), double data rate (DDR) synchronous dynamic random-access memory (DDR SDRAM), static random-access memory (SRAM), and pseudostatic random-access memory (PSRAM). Systems and computing devices that implement the various embodiments may also include or use electronic (solid-state) non-volatile computer storage mediums, such as FLASH memory. Each of the above-mentioned memory technologies include, for example, elements suitable for storing instructions, programs, control signals, and/or data for use in or by a computer or other digital electronic device. Any references to terminology and/or technical details related to an individual type of memory, interface, standard or memory technology are for illustrative purposes only, and not intended to limit the scope of the claims to a particular memory system or technology unless specifically recited in the claim language.

The performance, security, and power consumption characteristics of computer memories are important design criterion for engineers and electronics manufacturers. For example, the access time required for a portable computing device to access and use the information stored in its various types of memories may have a significant impact on the responsiveness and usability of the device. In addition, portable computing device users now commonly use their devices to store sensitive information (e.g., credit card information, contacts, etc.) and/or to accomplish tasks for which security is important. For example, portable computing device users now frequently use their devices to purchase goods, send and receive sensitive communications, pay bills, manage bank accounts, and conduct other sensitive transactions. These transactions often require that the computing device store in a secure manner sensitive or confidential information of high value to thieves and nefarious actors. For these reasons, it is becoming increasingly important to secure the information that is stored in a computing device's memory without consuming a significant amount of the computing device's processing or battery resources.

It is possible for a thief or nefarious actor to physically deconstruct a computing device and/or its SOC, remove its internal or external memories, and recover sensitive information from those memories. A security solution could attempt to prevent such attacks by encrypting all of the information that is stored in a computing device's memory. However, encrypting the entire contents of all memories in the computing device and decrypting the information each time it is used could consume a significant amount of that device's processing and battery resources. In resource constrained systems, such as portable computing devices, such extensive encryption/decryption operations could render the device unresponsive or unusable for significant periods of time or otherwise degrade the user experience.

To balance tradeoffs between performance, power consumption and security, modern computing devices only encrypt the contents of storage memories, such as ROM or FLASH memories. That is, since DRAM and SRAM memories require power to store and retain data, information stored in these memories typically disappears a few microseconds after the computing device is powered down. As a result, thieves and nefarious actors are not able to deconstruct the device to extract the information before that information disappears.

Due to these and other characteristics of DRAM and SRAM memories, modern computing devices typically do not encode the bulk of information that is stored in DRAM and SRAM memories. In addition, DRAM and SRAM memories have high-speed read-write characteristics (i.e., short access times) and are typically used for temporary storage of execution code or for other operations that benefit from the high-speed read and write operations. Encrypting and decrypting the contents of such memories takes time for each read/write operation, and thus could negatively impact performance and responsive of the computing device.

Unlike DRAM and SRAM memories, NVRAM memories are random-access memories that retain data even when power is turned off. However, like DRAM and SRAM memories, NVRAM memories have high-speed read-write characteristics (i.e., short access times). As such, using NVRAM memories allow a computing device to benefit from both the high-speed read-write characteristics of a random-access memory, and the information retention characteristics of ROMs or storage memories. NVRAM have a benefit over DRAM and SRAM memories in that there is no need to refresh the memory periodically, which saves power. However, NVRAM memories are expensive to manufacture and typically have a much smaller storage capacity than DRAM and SRAM memories. In addition, because NVRAM memories retain data, the information stored in NVRAM memories requires encryption and/or other similar security measures. Otherwise, a thief or nefarious actor could deconstruct the device, remove the NVRAM memories, and extract the information contained thereon. For these reasons, a different set of security protocols are appropriate for NVRAM than for DRAM or SRAM.

A FLASH memory is an erasable and reprogrammable ROM or storage memory. FLASH memories are non-volatile in that they retain data when power is turned off. However, unlike NVRAM technologies, a FLASH memory is not a true random-access memory. A FLASH memory is not bit addressable and requires that the computing device read and write in large blocks. Additionally, reading or writing to a FLASH memory is a much slower operation than reading or writing to a NVRAM memory. Further, due to the large block sizes required in FLASH memories, encrypting the contents of a FLASH memory is a relatively slow operation that could consume a significant amount of the available processing and power resources of the computing device.

The various embodiments include methods, and computing systems configured to implement the methods, for securely and intelligently utilizing NVRAM memories for rapid bootup, rapid state-changes, low-power device operation, and high-speed code execution.

A computing device processor may be configured to operate in non-enhanced memory mode (or normal mode) by reading a software application program from a storage memory (e.g., ROM, FLASH, etc.), decrypting the program, decompressing the program, and loading a copy of the decrypted and decompressed program into a volatile memory (e.g., DRAM). The computing device processor may then transfer control to a program counter, which uses the processor to start executing the code from the volatile memory.

Executing code from the volatile memory takes longer and consumes more power than executing the same code from NVRAM. Accordingly, in some embodiments, the computing device processor may be configured to securely operate in an enhanced memory mode (e.g., power saving mode, high-speed execution mode, etc.) using NVRAM that improves boot times, state transition speeds, execution times, and/or power consumption characteristics of the program or device. In some embodiments, the computing device processor may be configured to transition to the enhanced memory mode by setting a flag or register value that causes a rapid boot, low-power operation, high-speed execution, etc. to occur in the next phase, cycle, reboot or startup.

In some embodiments, the computing device processor may be configured to detect programs, operations, or conditions for which characteristics of NVRAM would beneficial, transition to operate in an enhanced memory mode that utilizes NVRAM for a limited time, and transition back to normal mode (or non-enhanced memory mode) for other operations. As used herein, the term "enhanced memory mode" refers to a mode of operation in which executable code is stored in, maintained in, and/or executed from the NVRAM to improve operation of the computing device, such as providing power savings, faster operation, and/or low latency booting. By operating in the enhanced memory mode that utilizes NVRAM for a limited time, and transitioning back to normal mode for more routine operations, the processor may intelligently utilize limited NVRAM resources and ensure that sufficient NVRAM resources remain available for other uses. Examples of enhanced memory modes are described throughout the specification, for example with reference to FIG. 6 and FIG. 7.

In some embodiments, the computing device processor may be configured to inspect/evaluate the current and/or next operating program to determine whether the system or program would benefit from rapid bootup, rapid state-changes, low-power device operation, or high-speed code execution. The computing device processor may determine whether the program could fit in the available NVRAM storage capacity. The computing device processor may load the program into the available NVRAM in response to determining that the program would benefit from low-power device operation or high-speed code execution and the program could fit in the available NVRAM storage capacity. The computing device processor may then execute the program from the NVRAM by transferring control to the appropriate program counter.

For example, a processor in a wearable computing device (e.g., watch, etc.) could evaluate a pedometer software application to determine that the application reads information from a pedometer, enters a sleep state, and then wakes every 100 milliseconds to read additional or updated information from the pedometer. Based on this evaluation, the processor may determine that the operations for entering and exiting the sleep state consume a significant amount of the device's limited battery resources reloading the instructions to DRAM (e.g., more than the operations for reading information from the pedometer, etc.) and/or that the pedometer application would otherwise benefit from rapid boot and low-power device operation. The processor may then determine the amount of NVRAM that is available for use, determine that the pedometer application could fit in the available NVRAM storage capacity, load the pedometer application into the available NVRAM, and execute the application from the NVRAM. In this example, executing the application from the NVRAM improves the performance and functioning of the wearable computing device by improving its boot time and lowering its power consumption.

In some embodiments, the computing device processor may determine that a program that would benefit from rapid bootup (or rapid state-changes, low-power device operation, high-speed code execution, etc.) cannot not fit in the available NVRAM storage capacity. In response, the computing device processor may partition the program into image portions, identify the image portion(s) that would most benefit (or cause the device to benefit most) from the low-power device operation or high-speed code execution, load the identified image(s) into the available NVRAM, and execute only those portions from the NVRAM. The computing device processor may load the other portions of the partition into DRAM or other similar volatile memory, and execute those code portions separately from their respective memories in conjunction with the execution from NVRAM. In various embodiments, the computing device processor may be configured to execute the different portions from different memories serially, in conjunction with one another, concurrently or in parallel. Executing a portion of the code from the NVRAM in this manner improves the functioning of the device by improving its performance and power consumption characteristics.

In some embodiments, the computing device processor may be configured to determine whether the continued execution of a program or image portion from the NVRAM remains beneficial to the device (e.g., provides continued power savings, high speed execution remains important, etc.). In response to determining that continued execution of a program or image portion from the NVRAM does not significantly improve the device's performance or power consumption characteristics, the computing device may remove the program or image from executing using NVRAM so that the application executes from a volatile memory (e.g., DRAM). The computing device may remove the program or image from executing using NVRAM so that the application executes from a volatile memory in response to determining that greater improvements to the performance or power consumption characteristics of the device could be realized by executing another program or portion in the NVRAM. By continuously or repeatedly evaluating the programs or portions that execute from NVRAM, and removing underperforming sections from the NVRAM, the various embodiments improve the functioning of the device by ensuring that the limited NVRAM resources are used in the most efficient manner.

In some embodiments, the computing device processor may be configured to initiate a self-destruct feature of the NVRAM or perform self-destruct operations to permanently disable the NVRAM in response to a determination consistent with an authorized attempt to access information stored in the memory. For example, upon device boot-up, the processor may cause the computing device to enter a normal or default state in which a gate mechanism that controls read/write access to the NVRAM is locked. The processor may receive a password for another component (e.g., SOC, authentication engine, etc.), and perform password authentication operations to determine whether the received password is valid or authentic. In response to determining that the password is valid/authentic, the processor may unlock the gate mechanism to enable read/write access to the NVRAM. On the other hand, in response to determining that the password is not valid or authentic, the processor may increment a counter value and/or determine whether the counter value exceeds a threshold value. If the counter exceeds the threshold value, the processor may activate the self-destruct feature of the NVRAM, or commence executing self-destruct operations, to permanently disable the NVRAM.

In some embodiments, the computing device processor may be configured to boot up in a normal or non-enhanced memory mode and commence execution of software application programs. The processor may evaluate a currently operating software application program and/or the software application programs that are included in the device's execution queue. The processor may determine whether the computing device would benefit from rapid bootup, rapid state-changes, low-power device operation, or high-speed code execution based on a result of evaluating the currently operating software application program and/or the software application programs included in the device's execution queue.

In response to determining that the computing device would benefit from rapid bootup, rapid state-changes, low-power device operation or high-speed code execution, the computing device processor may set the value of an enhanced memory mode indicator to indicate or specify that the subsequent boot should be in the enhanced memory mode. The enhanced memory mode indicator may be a low power mode indicator, rapid boot time mode indicator, rapid state-transition mode indicator, high-speed execution mode indicator, a register, a flag, a pass gate key/value, gate mechanism, a value stored in any non-volatile memory of the device, etc. After setting the value of an enhanced memory mode indicator, the computing device processor may perform various operations to cause the computing device to enter into a power-down state (or sleep state, power collapse state, hibernate state, deep-sleep state, re-start state, off state, etc.).

The computing device processor may receive a command to exit the power-down state, read the value of the enhanced memory mode indicator, and determine that the device should operate in enhanced memory mode based on the value of the enhanced memory mode indicator. In response, the processor may create a trusted channel to the NVRAM and commence operating in the enhanced memory mode by executing all or portions of a software application program from the NVRAM. The processor may use the trusted channel to read and write to the NVRAM during program execution.

FIG. 1 illustrates a block diagram of a system 100 that may be included in a portable computing device configured to intelligently boot up in a normal mode or an enhanced memory mode (e.g., power savings mode, high performance mode, etc.) in accordance with some embodiments. In the example illustrated in FIG. 1, the system 100 includes an external applications processor (AP) 140, an SOC 102, an NVRAM component 104, a RAM component 105, a storage memory component 106, and a power management controller 108.

The SOC 102 may include a number of subsystems and logical blocks that enable various functionalities within the computing device. For example, FIG. 1 illustrates that the SOC 102 may include a CPU 110, an SRAM component 112, a ROM component 114 that includes a trusted boot program 130, various interconnections/buses 116, 124, 125, 126, 128, 142, a power management interface 118, an NVRAM controller 120, a RAM controller 121, a storage memory controller 122, an inline cryptography engine (ICE) 160, fuses 132, a keygen engine 165, a digital signal processor (DSP) 167, an authentication engine 169, and an Input/Output (I/O) controller 199.

Each of the interconnections/buses 116, 124, 125, 126, 128, 142 may be a logical fabric, a physical fabric, a network on chip (NoC), or any number of equivalent communication channels. The NVRAM component 104 may include a gate mechanism 172. The storage memory component 106 may include a secondary boot program 106A. In some embodiments, the power management controller 108 may include a timer component 146 and a flag component 148. In other embodiments, the timer component 146 and/or the flag component 148 may be included in another component or sub-system that includes a non-volatile memory, such as within the storage memory component 106.

The CPU 110 may be electronically coupled to various components within the SOC 102 via the interconnections/bus 116. The CPU 110 may be configured to execute software application programs to implement the various functions described in this application.

The SRAM component 112 may be electronically coupled via the interconnections/bus 116 to the various components within the SOC 102. SRAM is a type of semiconductor memory that uses bistable latching circuitry and is typically used for CPU-related caching operations.

The ROM component 114 may be electronically coupled via the interconnections/bus 116 to the various components within the SOC 102. The ROM component 114 may store or contain data that is accessible by the CPU 110, including boot-related code and/or instructions. The trusted boot program 130 may reside within the ROM component 114. The trusted boot program 130 may be utilized by the SOC 102 during boot operations to power up the computing device that includes the SOC 102. In some embodiments, the trusted boot program 130 may be executed by the CPU 110 using a trusted execution environment, or a TrustZone configuration, to ensure secure access and execution of the trusted boot program 130.

A cold boot may be required when the computing device is in a power-off state. During a cold boot, the volatile memory (e.g., RAM component 105) may be unknown or may contain unreliable data. In some embodiments, the trusted boot program 130 may be stored in the ROM component 114, which allows the trusted boot program 130 to be stored in a substantially unalterable state.

A secondary boot program 106A stored in storage memory component 106 may be authenticated by the trusted boot program 130 prior to operation. There may be multiple untrusted secondary boot programs (not illustrated separately). These untrusted secondary boot programs may be copied from the storage memory component 106 into the SRAM component 112, RAM component 105, or NVRAM component 104 to enable programmatic execution after successful authentication and/or decryption. Untrusted secondary boot programs may be authenticated and executed sequentially, concurrently, or any combination thereof during the overall boot process. Decryption may invoke an inline cryptography engine (e.g., ICE 160). During sleep, volatile memory is known and remains trusted. As such, booting or transitioning out of a sleep mode or sleep state generally requires substantially fewer operations than performing a cold boot from the power-off state.

An authentication engine 169 may be electronically coupled to various components of the SOC 102 via the interconnections/bus 116. The authentication engine 169 may be configured to provide verification of data and/or instructions relating to boot operations of the computing device. In some embodiments, the authentication engine 169 may be configured to assist the trusted boot program 130 stored in the ROM component 114. For example, the authentication engine 169 may be configured to assist the trusted boot program 130 with the authentication of an untrusted secondary boot program 106A.

In some embodiments, in a series of sequential boot programs, the authentication engine 169 may be configured to assist a first secondary boot program 106A with the authentication of a second, untrusted, secondary boot program (not illustrated separately in FIG. 1).

In some embodiments, the authentication engine 169 may be configured to unlock the gate mechanism 172 and provide access to the NVRAM component 104 via a secured channel.

In some embodiments, the authentication engine 169 may be replaced by a program executing within the CPU 110 in secure mode. For example, the system could be configured to invoke a TrustZone mode configuration within the CPU 110, thereby allowing the CPU 110 to securely execute an application program that performs the functions of the authentication engine 169.

A digital signal processor (DSP) 167 may be electronically coupled via an interconnections/bus 116 to the various components within the SOC 102. The DSP 167 may be used to measure, to filter, and/or to compress continuous real-world analog signals. Many of the functions or algorithms configured within the DSP 167 may be operable to being executed on the CPU 110. The DSP 167 may have better power efficiency and higher performance for certain operations. In some embodiments, a first set of operations may be allocated to the CPU 110, and a second set of operations may be allocated to the DSP 167. This may allow the system to benefit from the advantages of that each of the processing units (i.e., CPU 10 and DSP 167) provide. In various embodiments, the first and second sets of operations may be coextensive and/or related.

The keygen engine 165 may be electronically coupled to various components within the SOC 102 via the interconnections/bus 116. In some embodiments, the keygen engine 165 may be configured to generate secure keys. In some embodiments, the keygen engine 165 may be configured to generate keys that are suitable for use in configuring the ICE 160 component. Further, the keys may initialize the secure channel with the NVRAM component 104. In some embodiments, the keygen engine 165 may be a hardware block that has additional security measures to prevent hacking, tampering, snooping, etc. The ICE 160 component may be utilized, in some embodiments, to encrypt or decrypt software images including the secondary boot programs 106A stored within the storage memory component 106. In some embodiments, the ICE 160 component may be configured to perform the cryptography in line with storage (e.g., embedded Multi-Media Controller (eMMC), Universal Flash Storage (UFS), etc.) or input-output interfaces (e.g., universal serial bus (USB), Peripheral Component Interconnect Express (PCIe), etc.). In some embodiments, the ICE 160 may be implemented in a separate hardware block and not integrated within the storage memory controller 122.

In some embodiments, the keygen engine 165 may be configured to access data from the ROM component 114 and/or the fuses 132 to complete operations by the ICE 160. The fuses 132 may be electronically coupled via the interconnections/bus 116 to the various components within the SOC 102. In various embodiments, any or all of the fuses 132 may be programmable read-only memory (PROM), field programmable read-only memory (FPROM), one-time programmable non-volatile memory (OTP NVM), or another similar non-volatile memory.

The power management interface 118 may be connected via the interconnections/bus 124 to the power management controller 108. Likewise, the power management interface 118 may be electronically coupled via the interconnections/bus 116 to the various components within the SOC 102. Inside the power management controller 108, a timer 146 may be utilized to track events (e.g., wake-up alert, assist with power control, assist with boot operations, etc.). For example, an IoT device may be configured to wake up once every ten (10) minutes to perform a sensing task. The power management controller 108 may have a flag component 148 that indicates the desired power state of the SOC 102 when the SOC 102 boots. For example, the flag component 148 may indicate a normal mode or an enhanced memory mode.

The NVRAM controller 120 may be electronically coupled via the interconnections/bus 126 to the NVRAM component 104. Likewise, the NVRAM controller 120 may be electronically coupled via the interconnections/bus 116 to the various components within the SOC 102. The NVRAM component 104 may be used for operational storage of data and executable code while the SOC 102 is in operation or powered down. One of skill in the art will appreciate that NVRAM component 104 may be spin-transfer torque magnetoresistive random-access memory (STT-MRAM), resistive random access memory (RE-RAM), three-dimensional cross point (3D-XPOINT), etc.

In some embodiments, the NVRAM component 104 may be secured by the gate mechanism 172, which prevents unauthorized access to data and/or code stored within the NVRAM component 104. One of skill in the art will appreciate the need for the gate mechanism 172 because NVRAM component 104 is operable to store data even after the SOC 102 has been powered down. As such, the data contained within the NVRAM component 104 may be of high value to the user and require additional security measures which may not be necessary with traditional forms of RAM as traditional forms tend to lose data quickly once powered down (i.e. the memory is volatile).

The RAM controller 121 may be electronically coupled via the interconnections/bus 125 to a RAM component 105. Likewise, the RAM controller 121 may be electronically coupled via the interconnections/bus 116 to the various components within the SOC 102. The RAM component 105 may be used for operational storage of data, stack, and executable code while the SOC 102 is in operation.

The storage memory controller 122 may be electronically coupled via the interconnections/bus 128 to a storage memory component 106. Likewise, the storage memory controller 122 may be electronically coupled via the interconnections/bus 116 to the various components of the SOC 102. The storage memory component 106 may be used for storage of data and executable code while the SOC 102 is in operation or powered down. In some embodiment, the ICE 160 may be included within the storage memory controller 122. In various embodiments, the ICE 160 component may be implemented in hardware, software, firmware, or any combination thereof. In some embodiments, the ICE 160 component may be configured to implement various security measures to prevent tampering, hacking, snooping, etc.

The external applications processor (AP) 140 may be electronically coupled to an I/O controller 199, within SOC 102, via the interconnections/bus 142, allowing communication between AP 140 and SOC 102. Further, the AP 140 and SOC 102 may selectively share resources. Communication between the AP 140 and the SOC 102 may include bidirectional transmission of control signals, status messages, and/or other data. Shared resources between the SOC 102 and the AP 140 may include any internal state or functional feature, e.g. permanent read-only memory, volatile memory, non-volatile memory, processors, accelerators, engines, etc.

In some embodiments, the external AP 140 may be an SOC. In some embodiments, the external AP 140 may be a processor configured for a host of specialized tasks that supplement the functionality of SOC 102. One of skill in the art will appreciate that modern computing devices may include a myriad of SOCs, processors, memories, etc. External AP 140 is illustrated to emphasize that yet another SOC and/or processor may interact with SOC 102 to achieve a desired functionality of a mobile device or portable computing device (e.g., communicating over cellular networks, capturing video/images, playing three-dimensional games, etc.). For example, external AP 140 may be a graphics processing unit (GPU) configured to provide graphical processing assistance to the SOC 102. In another example, the external AP 140 may be a cellular communication SOC configured to enable wireless communication of the computing device via the SOC 102.

Figure 2:
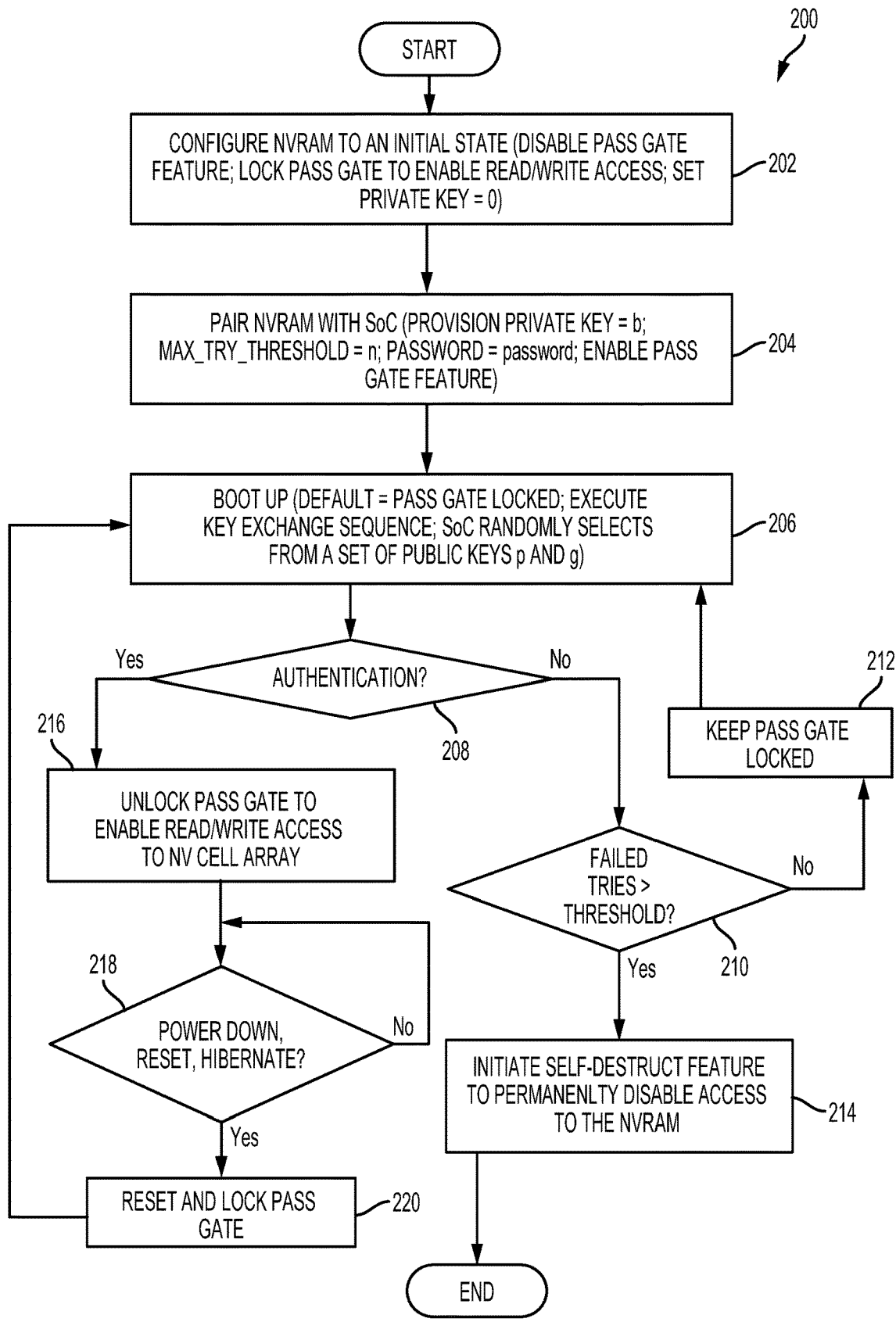
FIG. 2 is a process flow diagram illustrating a method of initializing a computing device manufactured to incorporate an SOC and NVRAM in accordance with an embodiment.

FIG. 2 illustrates an embodiment method 200 for initializing a computing device manufactured to incorporate the SOC 102 and the NVRAM component 104. With reference to FIGS. 1 and 2, the method 200 may be performed by a processor of a portable computing device and/or one or more components in the system 100, such as the SOC 102, CPU 110, DSP 167, NVRAM component 104, fuses 132, authentication engine 169, gate mechanism 172, etc. In the following description of FIG. 2, reference is made to a "processor" performing operations of the method 200 to generally encompass the various processors and/or circuits that may perform the method operations.

In block 202, the processor (e.g., CPU 110, DSP 167, etc.) may configure the NVRAM component 104 to an initial state in which the pass gate feature is initially disabled by unlocking the gate mechanism 172 and setting a private key=0. In block 204, the processor may pair the NVRAM component 104 with the SOC 102 by provisioning a private key=b, setting the self-destruct counter threshold (MAX_TRY_THRESHOLD)=n, a password="password", and enabling the pass gate feature.

In block 206, the processor may commence executing a boot-up sequence to wake or boot up the portable computing device. Upon device boot-up, the processor may cause the device to enter a default state in which the gate mechanism 172 is locked. In addition, the processor may execute a key exchange sequence and/or randomly select from a set of public keys p and g.

In determination block 208, the processor, the authentication engine 169 and/or the NVRAM component 104 may initiate password authentication and determine whether the password is valid or authentic. In some embodiments, the processor may also be configured to increment or clear a self-destruct failed tries (SDFTC) value in block 208. In response to authenticating the password or determining that the password is valid/authentic (i.e., determination block 208="Yes"), the processor may unlock the gate mechanism 172 to enable read/write access to the NVRAM component 104 in block 216. In some embodiments, after successfully unlocking the gate mechanism 172 in block 216, the processor may reset the SDFTC value.

In determination block 218, the processor may determine whether it received instructions (e.g., from a software application program, etc.) requesting that the device power down, reset, hibernate or enter another similar state. In response to determining that instructions requesting that the device power down, reset, hibernate or enter another similar state have not been received (i.e., determination block 218="No"), the processor may continue processing operation (e.g., executing instructions, waiting for an interrupt, etc.) until it determines that it received instructions requesting that the device power down, reset, hibernate or enter another similar state in determination block 218.

In response to determining that instructions requesting that the device power down, reset, hibernate or enter another similar state have been received (i.e., determination block 218="Yes"), the processor may lock the gate mechanism 172 in block 220. The processor may then cause the device to enter the requested state until it receives instructions to commence executing the boot-up sequence to wake or boot up the portable computing device in block 206. In some embodiments, the powering down, resetting or entering a hibernate mode in block 218 may occur after a period of run-time execution to complete the tasks.

In response to determining that the password is not valid or authentic (i.e., determination block 208="No"), the processor may determine whether the SDFTC value exceeds a threshold value (e.g., MAX_TRY_THRESHOLD value, etc.) in determination block 210. In some embodiments, the processor may also increment or update SDFTC value in block 208.

In response to determining that the SDFTC value exceeds the threshold value (i.e., determination block 210="Yes"), the processor may initiate a self-destruct feature or commence executing self-destruct operations to permanently disable the NVRAM component 104 in block 214.

In response to determining that the SDFTC value does not exceed the threshold value (i.e., determination block 210="No"), the processor may maintain the gate mechanism 172 in the "locked state" in block 212. The processor may then increment the SDFTC value (if needed) and wait to receive instructions to commence executing the boot-up sequence to wake or boot up the portable computing device in block 206.

In the example illustrated in FIG. 2, the processor enables the pass gate feature as part of the part of the operations for pairing the NVRAM component 104 with the SOC 102. However, it should also be appreciated that, in some embodiments, the NVRAM component 104 may be paired with the SOC 102 in block 204 without enabling the pass gate feature. In this manner, the NVRAM component 104 may be used in a "legacy" mode with an SOC that is not configured to support tamper-proof operations. For example, in some embodiments, the SOC 102 may not include fuses 132. As another example, the SOC 102 may not support the additional commands that may be required communicate with and control the gate mechanism 172.

Figure 3:
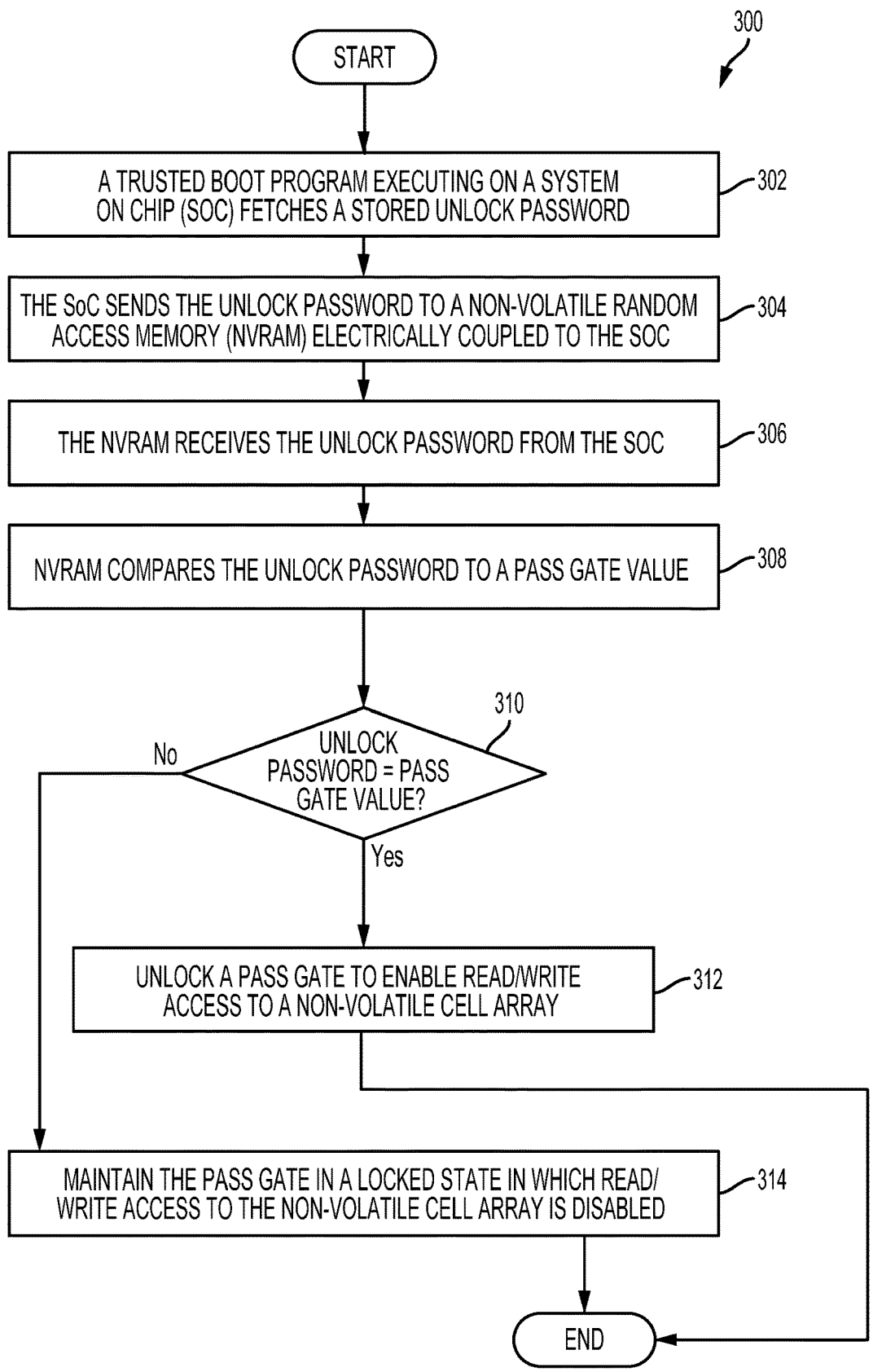
FIG. 3 is a process flow diagram illustrating a method of providing secure access to NVRAM in accordance with an embodiment.

FIG. 3 illustrates a method 300 for providing secure access to NVRAM component 104 via the gate mechanism 172, the fuses 132, and the NVRAM fuse(s) (not illustrated). With reference to FIGS. 1-3, the method 300 may be performed by a processor of a portable computing device and/or one or more components in the system 100 or SOC 102, such as the CPU 110, DSP 167, NVRAM component 104, fuses 132, authentication engine 169, gate mechanism 172, etc. In the following description of FIG. 3, reference is made to a "processor" performing operations of the method d00 to generally encompass the various processors and/or circuits that may perform the method operations.

In block 302, the processor may initiate a boot sequence to boot up the device and commence executing the trusted boot program 130. In some embodiments, the trusted boot program 130 may execute on the CPU 110. In some embodiments, the trusted boot program 130 may execute on the DSP 167. The trusted boot program 130 may initialize a fetch of the unlock password stored in fuse(s) 132 on the SOC 102.

In block 304, the processor and/or NVRAM controller 120 may send an unlock password to the NVRAM component 104. In some embodiments, the NVRAM controller 120 may send the unlock password to the NVRAM component 104 via interconnections/bus 126 in block 304. In some embodiments, the unlock password may be sent in an encrypted format. In some embodiments, the unlock password may be sent in an unencrypted format. In some embodiments, encryption may be performed within the SOC 102. In some embodiments, the unlock password may be encrypted programmatically by software running on the CPU 110.

In block 306, the NVRAM component 104 may receive the unlock password. In block 308, the NVRAM may compare the unencrypted unlock password to a value stored in fuse(s) 132 to generate a comparison result. In determination block 310, the processor may determine whether the unlock password matches the value in the fuse(s) 132 based on the comparison result.

In response to determining that the unlock password matches the value in the fuse(s) 132 (i.e., determination block 310="Yes"), the processor may unlock the gate mechanism 172 to unlock or enable access to the NVRAM component 104 in block 312. After the functions in the block 312 have completed, the method 300 proceeds to the END block and terminates.

In response to determining that the unlock password does not match the value in the fuse(s) 132 (i.e., determination block 310="No"), the processor may maintain the gate mechanism 172 in the locked state in block 314 to prevent read/write access to the NVRAM component 104. The processor may then end the method 300 in the END block.

It should be appreciated that the unlock method/operations may be operated by various ways, either the CPU 110, the DSP 167, or other micro-processor (not illustrated) in the SOC102, to accommodate power consumption, level of security, etc.

It should also be appreciated that the gate mechanism 172 in the NVRAM component 104 may be implemented in various ways to accommodate any or all of cost, complexity, performance, level of security, and/or other similar factors. One of ordinary skill in the art will appreciate the design advantages of implementing the gate mechanism 172 with relatively uncomplicated circuits and logic using minimal memory die area without the use of a more complicated microcontroller. However, one of skill in the art may arrive at complex implementations that achieve the same functionality described herein.

Figure 4A:
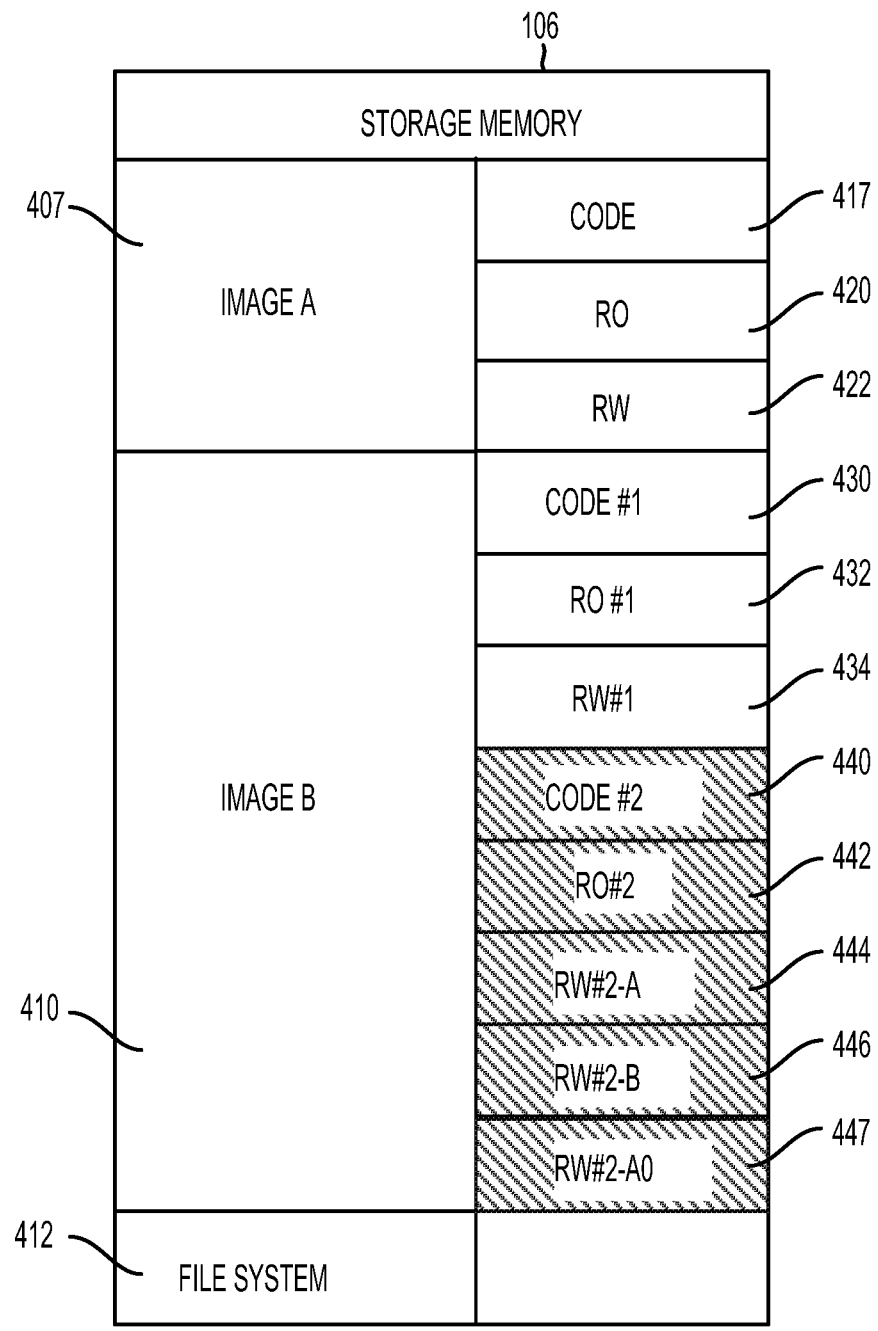
FIG. 4A is a block diagram depicting a logical relationship of storage memory data.

FIG. 4A is a block diagram illustrating a storage memory component 106 that includes non-volatile images of programs that may be loaded from storage (e.g., ROM, FLASH, etc.) into, and run on, the RAM component 105 and/or the NVRAM component 104 in accordance with the various embodiments. In the example illustrated in FIG. 4A, the storage memory component 106 includes an image A 407 portion, an image B 410 portion, and a file system 412 portion. In some embodiments, image A 407 may be associated with a DSP 167. In some embodiments, image B 410 may be associated with a CPU 110.

In some embodiments, image A 407 may include a code portion 417, a read-only (RO) portion 420, and a read-write (RW) portion 422. The code portion 417 may be configured to carry out the operations of the DSP 167. For example, the DSP 167 may be operable to manage enhanced or low-power processing operations related to a specific functionality supported by the SOC 102 (e.g., analog-to-digital cellular communication). The RO portion 420 may contain constants, default values, lookup tables, additional static data that do not change the value during runtime execution, upon which the code portion 417 operates. The RW portion 422 may contain initial values for the data that may be utilized by the code portion 417 for the DSP 167 to preform operations that require both read and write operations to RAM component 105, NVRAM component 104, and/or the storage memory component 106. In some embodiments, image A 407 may include the initial state of program A, and may be copied from storage memory component 106 into RAM component 105, NVRAM component 104, or SRAM component 112 for execution.

Comparing the image A 407 to the image B 410, the image A 407 may be associated with the DSP 167 whereas the image B 410 may be associated with the CPU 110. Image B 410 may be configured slightly differently than the image A 407 in that the image B 410 has a code #1 portion 430 and a code portion #2 440.

In some embodiments, the code #1 portion 430 may be configured to run in the RAM component 105 whereas the code #2 portion 440 may be configured to run within the NVRAM component 104.

The code #1 portion 430 may be associated with a RO #1 portion 432 and a RW #1 portion 434. The RO #1 portion 432 may contain data upon which the code #1 portion 430 operates. The RW #1 portion 434 may contain initial value for the data that may be utilized by the code #1 portion 430 for the CPU 110 to perform operations that require both read and write operations.

Code #2 portion 440 may be configured to operate within the NVRAM component 104. A RO #2 portion 442 may be associated with the image B 410. The RO #2 portion 442 may be configured to be operated on by the code #2 portion 440 in conjunction with the CPU 110. Further, the RO #2 portion 440 may be specifically configured to reside in NVRAM component 104. In some embodiments, the RO #2 portion 442 may store secure data that need not or should not be altered when the SOC 102 is in operation. Two read-write portions 444, 446 are configured as two separate portions, RW #2-*a* portion 444 and RW #2-*b* portion 446. The RW portions 444, 446 are described in further details below. One of skill in the art will appreciate that the RW portions 444, 446 may be utilized similar to the other RW portions/memories described herein. Such as, both RW #2-*a* portion 444 and RW #2-*b* portion 446 may be initiated in the NVRAM component 104 using the initial value in the storage memory component 106.

During runtime, the CPU 110 may read or write to the RW #2-*a* portion 444 and RW #2-*b* portion 446 in the NVRAM component 104. As such, the value in the NVRAM component 104 may be changed, but the initial value in the storage memory component 106 may remain unchanged and may be used to initialize the RW #2-*a* portion 444 and RW #2-*b* portion 446 in the NVRAM component 104 the next time the system boots up, if needed. However, there are advantages in having a plurality of RW portions 444, 446 as shall be described below.

One of skill in the art will appreciate that having independent code portions (e.g., code #1 portion 430 and code #2 portion 440) enables dynamic processing of tasks involving potentially separable functionality. As an illustrative example, the code #1 portion 430 may correspond to an audio encoder whereas the code #2 portion 440 may correspond to an audio decoder. If the user only desires to listen to music, then the exemplary code #1 portion 430 (containing the exemplary audio encoder) would not be needed to playback audio. Thus, the code #2 portion 440 (containing the exemplary audio decoder) would be loaded in the memory (e.g., RAM component 105, NVRAM component 104, etc.). One of skill in the art will appreciate further, complex use cases that exceed the scope of this description but are wholly consistent with proposed system 100.

A file system 412 may reside on the storage memory. The file system 412 may be a conventional file system operable to store user data (e.g., photos, emails, apps, etc.). For example, the SOC 102 may access the file system 412 to effect user-initiated operations (e.g. capturing and storing a digital photograph during a sporting event). In some embodiments, the file system 412 may be separate from the images 407, 410 as illustrated. In some embodiments, the file system 412 may encapsulate and contain the images 407, 410.

Figure 4B:
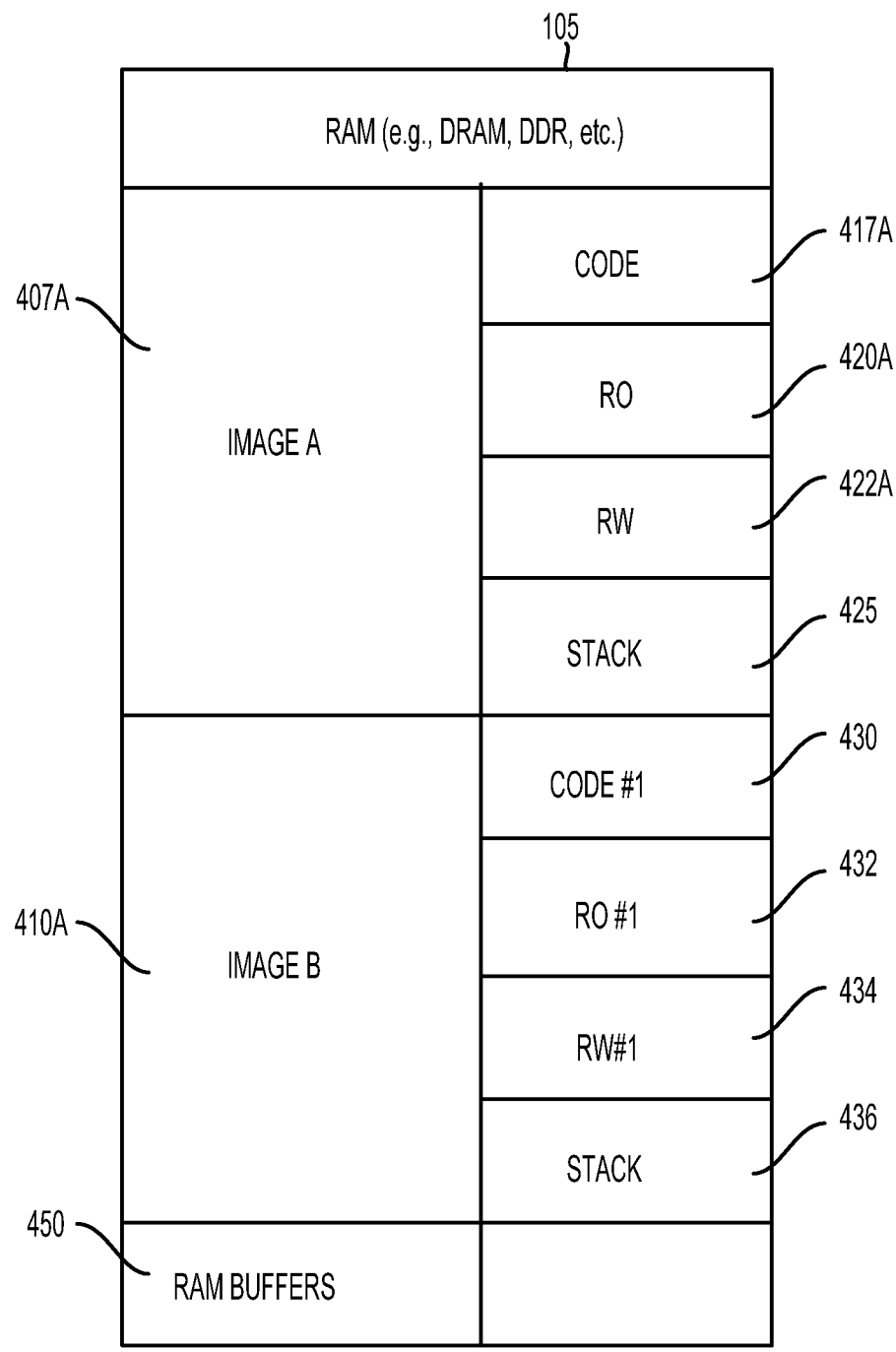
FIG. 4B is a block diagram depicting the logical relationship of RAM data.

FIG. 4B is a block diagram illustrating a RAM component 105 onto which programs may be loaded in accordance with the various embodiments. RAM data may reside within the RAM component 105, which may be a DDR or a DRAM semiconductor in some embodiments. In the example illustrated in FIG. 4B, the RAM component 105 includes an image A 407A portion, an image B 410A portion, and a RAM buffers 412 portion. In some embodiments, image A 417A and image B 410A may be loaded from the storage memory component 106 (illustrated in FIG. 4A) into the RAM component 105.

The image A portion 407A may be associated with a code portion 417A, a RO portion 420A, a RW portion 422A, and a stack 425. The code portion 417A, the RO portion 420A, and the RW portion 422A may be substantially similar to the code portion 417, the RO portion 420, and the RW portion 422 illustrated in FIG. 4A.

The image B portion 410A may be associated with a code #1 portion 430, a RO #1 portion 432, and a RW #1 portion 434, all of which may be the same or substantially similar to their respective portions in the storage memory component 106 illustrated in FIG. 4A. The image B portion 410A may also be associated with a stack portion 436, which is for completeness of the description and demonstrates that the image is executing in the RAM component 105.

RAM data may need to be stored and subsequently retrieved from the storage memory component 106 prior to the RAM data being loaded into the RAM component 105. The amount of RAM data may be smaller than the capacity of the RAM component 105 such that the substantial entirety of an image A 407A and an image B 410A may both be loaded into the RAM component 105. In some embodiments, the image A portion 407A may include a subset of the image A portion 407.

The RAM buffers 450 may provide static read or read-write memory for the various use cases provided by the code portions 417A, 430 loaded into the RAM component 105.

Figure 4C:
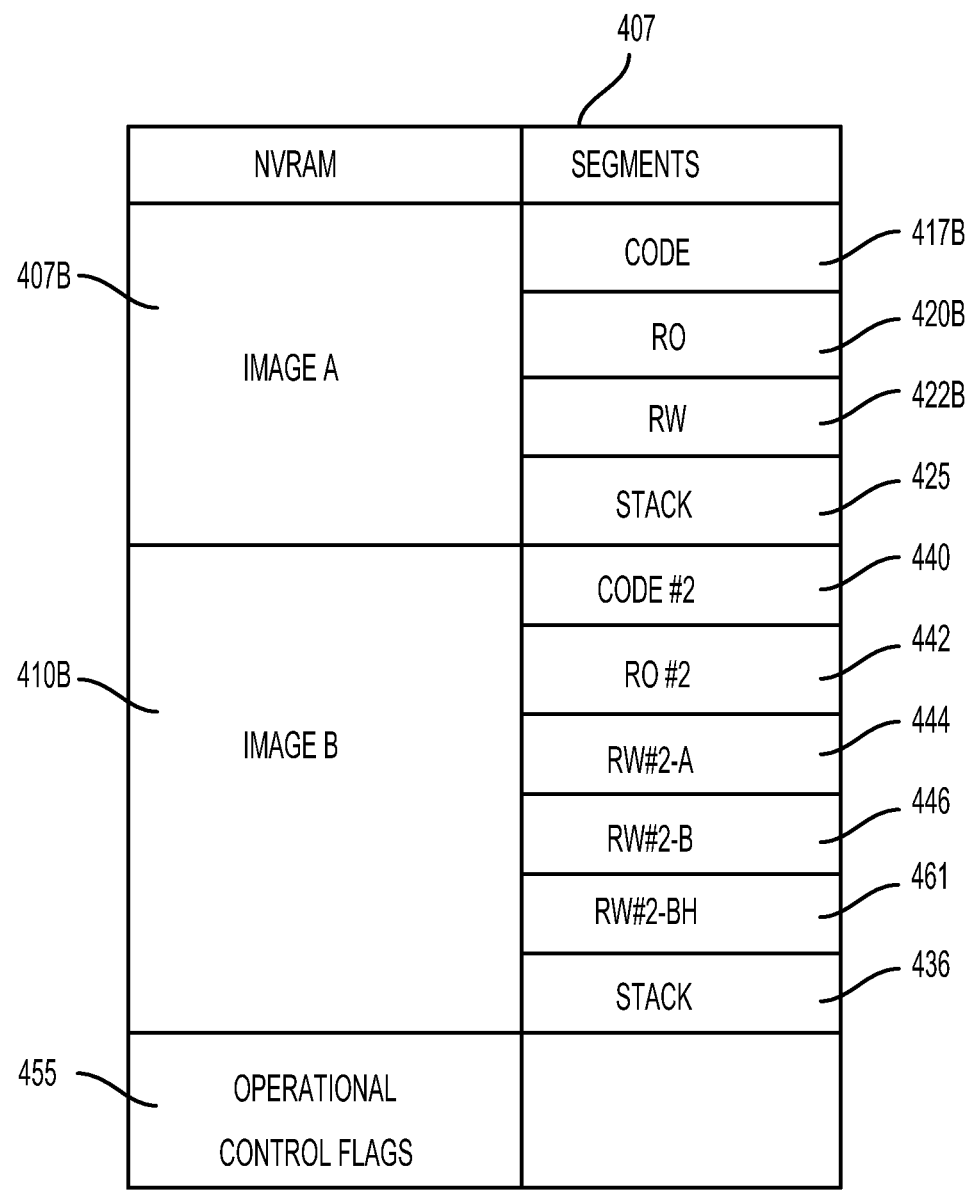
FIG. 4C is a block diagram depicting the logical relationship of NVRAM data.

FIG. 4C is a block diagram illustrating an NVRAM component 104 onto which programs may be loaded in accordance with the various embodiments. NVRAM data may reside within the NVRAM component 104. In the example illustrated in FIG. 4C, the NVRAM component 104 includes an image A 407B portion, an image B 410B portion, and an operations control flags 455 portion. In some embodiments, the image A 417B and the image B 410B may be loaded from the storage memory component 106 (illustrated in FIG. 4A) into the NVRAM component 104.

The image A portion 407B may be substantially similar to the image A portion 407 as stored in the storage memory component 106. Likewise, the image A portion 407B may be substantially similar to the image A portion 407A stored in the RAM component 105. Thus, the image A portion 407B may have a code portion 417B, a RO portion 420B, and a RW portion 422B, all of which may merely contain a subset of the full functionality available in their counterparts stored in the image A portion 407 as correspondingly stored in the storage memory component 106. The stack 425 may be present within the NVRAM data 407 and operate substantially similar to how the stack 425 operates in the RAM data 106.

The image B portion 410B may include the code #2 portion 440, the RO #2 portion 442, the RW #2-A portion 444, the RW #2-B 446, and a backup copy of RW #2-A 444 (referenced as RW #2-A0 447). In the NVRAM portion 410B, there may additionally exist a hash digest of RW #2-B 446, which may be called RW #2-BH 461. Further, in the NVRAM portion 410B, there may be a stack 436. One of skill in the art will appreciate that the image B portion 410B may be substantially similar to the image B portion 410 stored in the storage memory component 106.

Given the size limitations of current NVRAM implementations, the image A portion 407B may be a subset of the entirety of the image A 407 as stored in the storage memory component 106. For example, the SOC 102 may only need a subset of functionality offered by the DSP 167. As such, the SOC 102 may operate in the enhanced memory mode to reduce power consumption on the portable computing device. Operating in the enhanced memory mode may reduce power consumption on the device, in part, because only portions of the image A 407 are used for boot operations.

After initial booting, the value of the data in the RW #2-A portion 444 and the RW #2-B 446 may be updated/changed. Due to the non-volatile nature of the NVRAM component 104, in a subsequent boot up operation, without a reinitialization, the value of the data in the RW #2-A portion 444 and the RW #2-B 446 may remain as the updated/changed value, not the same as the initial value as in the image B 410 in storage memory component 106. However, some of the RW data may need to be reinitialized in order to execute the program in image B 410B. In some embodiments, the RW #2-A portion 444 may represent the portion that requires reinitialization, and the RW #2-B 446 may represent the portion that does not require reinitialization to original value(s) (instead retaining the state from previous executions/operations).

In some embodiments, the system 100 may seek to avoid the enablement and access of the storage memory component 106 in the subsequent boot. As such, a backup copy of the RW #2-A 444 called RW #2-A0 is saved in the NVRAM component 104 to avoid the need to enable and access the storage memory component 106.

The RW #2-A0 portion 447 may be utilized to reinitialize the RW #2-A portion 444 to its original value. In order for the RW #2-B 446 to verify the integrity of the data that remains after the reboot, a hash digest RW #2-BH portion 461 may be generated for the RW #2-B 446 with the latest value. In some embodiments, the RW #2-BH portion 461 may be saved in the NVRAM 406 and used to validate the RW #2-B portion 446 upon reboot. By having the RW #2-A0 and RW #2-BH portions 447, 461, the enhanced memory mode boot operations may avoid performing the operations for enabling and initiating the storage memory component 106, thereby reducing the energy consumption of the system 100.

Given the size limitations of the NVRAM component 104 (or NVRAM unit 407 depicted herein), some portions of the entirety of image B portion 410 may be loaded as the image B portion 410B. For example, the SOC 102 may be operating in an enhanced memory mode and only need a subset of the functionality offered by the CPU 110 because the enhanced memory mode saves power, in part, by only utilizing the necessary portions of the image B 410 to complete the boot operation.

A series of operational control flags may reside within the operations control flags 455 portion of the NVRAM component 104. The operational control flags may also be stored in any operable portion of memory/storage to complete the intended functionality. The operational control flags may be utilized to indicate to the SOC 102 whether to boot in normal mode or in enhanced memory mode.

With respect to the various images 407, 407A, 407B, 410, 410A, 410B, one of skill in the art will appreciate that any one of these images may be statically built or dynamically built (also known as "relocatable). For example, the images 407, 407A 407B, 410, 410A, 410B may be built according to a programmed memory layout to place the various image program parts into a designated address memory range and to further accommodate the operational environment and/or associated memory. As such, the system 100 may apply proper memory access control to different parts of the images 407, 407A, 407B, 410, 410A, 410B. Further, the operation system (OS) or high-level operating system (HLOS) may configure the memory access attributes differently to different parts of the image. Such a design may take advantage of the nature of different latency/power attributes, and further distribute different parts of an image to exploit benefits. For example, the image B 410 may be built with one part (the image B portion 410A) for the RAM component 105, and another part (the image B portion 410B) for the NVRAM component 104. Further, different images may be created for different purposes. For example, image A 407 may be built for the for CPU 110 and the image B 410 may be built for the DSP 167. One of skill in the art will appreciate that the CPU 110 and the DSP 167 may have different machine code. Therefore, it is common practice to use different compilers to create different images.

Fewer or more images may be created for specific use cases. One of skill in the art will appreciate the potential need to configure various software images for different configurations. For example, software images which can benefit from the non-volatile execute-in-place (XIP) behavior of the NVRAM component 104 may choose to take advantage of such benefits. Since the NVRAM component 104 may only be a fraction of the total memory available on the computing device, many of the images may be targeted to reside in the RAM component 105. In addition, NVRAM component 104, being smaller in capacity, may be operated at reduced performance levels (e.g., using bandwidth frequencies) compared to the RAM component 105, resulting in power savings when operating solely from NVRAM component 104 while RAM component 105 is in a sleep mode, power collapse mode, etc.

Figure 5:
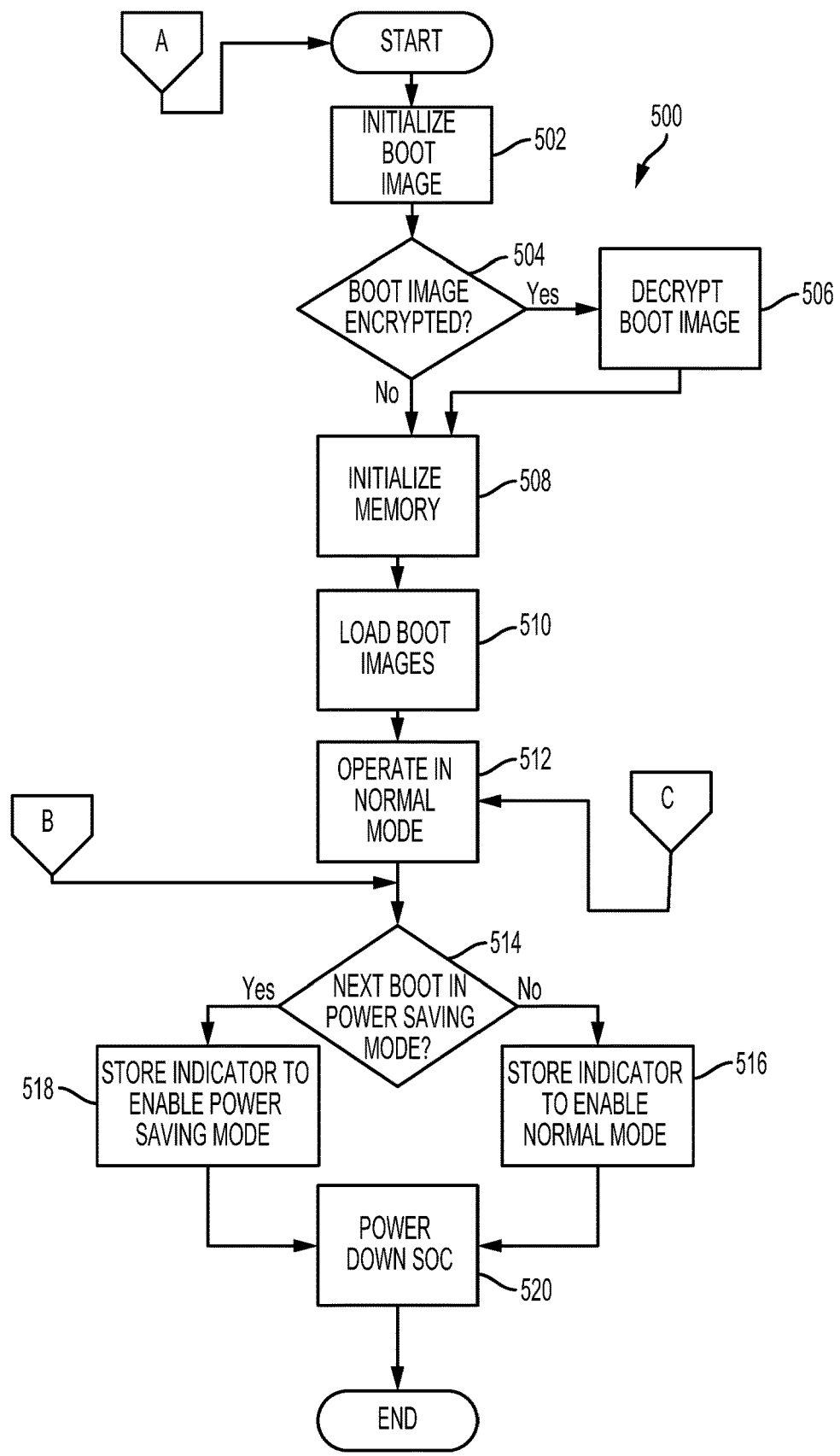
FIG. 5 is a process flow diagram illustrating a method of booting the SOC in a normal mode in accordance with an embodiment.

FIG. 5 illustrates a method 500 of configuring the SOC 102 to intelligently boot in normal (non-enhanced memory) mode or enhanced memory mode on subsequent boots in accordance with some embodiments. With reference to FIGS. 1-5, the method 500 may be performed by a processor of a portable computing device and/or one or more components in the system 100 or SOC 102, such as the CPU 110, DSP 167, NVRAM component 104, the RAM component 105, storage memory component 106, ROM component 114, fuses 132, flag component 148, ICE 160, etc. In the following description of FIG. 5, reference is made to a "processor" performing operations of the method 500 to generally encompass the various processors and/or circuits that may perform the method operations.

Beginning at START block, the processor may initialize the trusted boot program 130 in block 502. In some embodiments, the trusted boot program 130 may be accessed from the ROM component 114 such that the SOC 102 may initialize the proper subsystems. In determination block 504, the processor may determine whether the trusted boot program 130 is encrypted.

In response to determining that the trusted boot program 130 is encrypted (i.e., determination block 504="Yes"), the processor may decrypt the trusted boot program in block 506. In some embodiment, the trusted boot program may be decrypted in block 506 via an ICE 160. For example, the processor/CPU 110 may access the information stored in the fuses 132 and utilize the keygen engine 165 such that the trusted boot program 130 may be decrypted by the ICE 160 in block 506.

In response to determining that the trusted boot program 130 is not encrypted or otherwise does not need decryption (i.e., determination block 504="No"), the processor may initialize the various types of memory within the SOC 102 in block 508. For example, the processor may initialize the storage memory component 106, the RAM component 105, the NVRAM component 104, or combination thereof in block 508. One of skill in the art will appreciate other memory and storage subsystems may be initialized in block 508.

In block 510, the processor may load the image A and the image B portions (e.g., portions 407A and 410A) into the RAM component 105. In some embodiments, the processor may load parts of the image A and the image B portions into the SRAM component 112 in block 510. In other embodiments, the processor may allocate the image A and the image B portions to different memories depending on the intended use of the SOC 102. As previously discussed, the images portions may be statically or dynamically built to run from the NVRAM component 104 or from the RAM component 105. In some embodiments, the processor may authenticate the image A and the image B portions after they have been loaded into the memory.

In block 512, the processor may cause the SOC 102 to initiate a boot sequence and/or operate in normal (non-enhanced memory) mode to execute software application programs from one of the RAM memories. In some embodiments, operating in the normal mode in block 512 may include resetting the DSP 167 to its start state, instructing the CPU 110 to load the high-level operating system (HLOS)), rendering a series of boot messages on an electronic display of the portable computing device, playing start-up-related sounds to indicate a successful boot, or other similar operations.

In determination block 514, the processor may determine whether the SOC 102 should operate in enhanced memory mode after the next boot. Prior to determination block 514, the user may have the computing device in operation for a little as seconds or as long as months, thus one of skill in the art will appreciate that a non-trivial amount of time may pass as the processor executing the method 500 moves from block 512 to determination block 514.

In response to determining that the SOC 102 should not operate in enhanced memory mode after the next boot (i.e., determination block 514="No"), the processor may clear or set the flag component 148 in the power management controller 108 (or set a register, flag, indicator, or value in another non-volatile memory) in block 516 to indicate the subsequent boot should be in normal mode. In block 520, the processor may power down the SOC 102.

In response to determining that the SOC 102 should operate in enhanced memory mode after the next boot (i.e., determination block 514="Yes"), the processor may set or clear the flag component 148 in the power management controller 108 (or set a register, flag, indicator, or value in another non-volatile memory) in block 518 to indicate that the subsequent boot should be in enhanced memory mode. The flag component 148 may be located in the power management controller 108; however, one of skill in the art will appreciate that the flag component 148 could be stored in any location operable to store dynamic data available during an initial or subsequent boot. In block 520, the processor may power down the SOC 102.

The power down operation of the SOC 102 is beyond the scope of this description, but one of skill in the art will appreciate that a myriad of "clean-up" operations may need to be performed in block 520 to enable a successful, subsequent boot of the SOC 102. In addition, as one of skill in the art will appreciate, under a normal mode boot, the SOC 102 may repeat the method 500 several times to achieve any number of successful, subsequent boots.

One of skill in the art will appreciate that a number of alternative mechanisms to securely boot the SOC 102 may be utilized and would be beyond the scope of this detailed description. Further, one of skill in the art may opt to not encrypt the trusted boot program 130 if the operating environment of the SOC 102 allows such a lack of security. Conversely, the encryption/decryption method may be more robust than in the method 500. The operating environment of the SOC would influence one of skill in the art to enable the proper amount of security.

Figure 6:
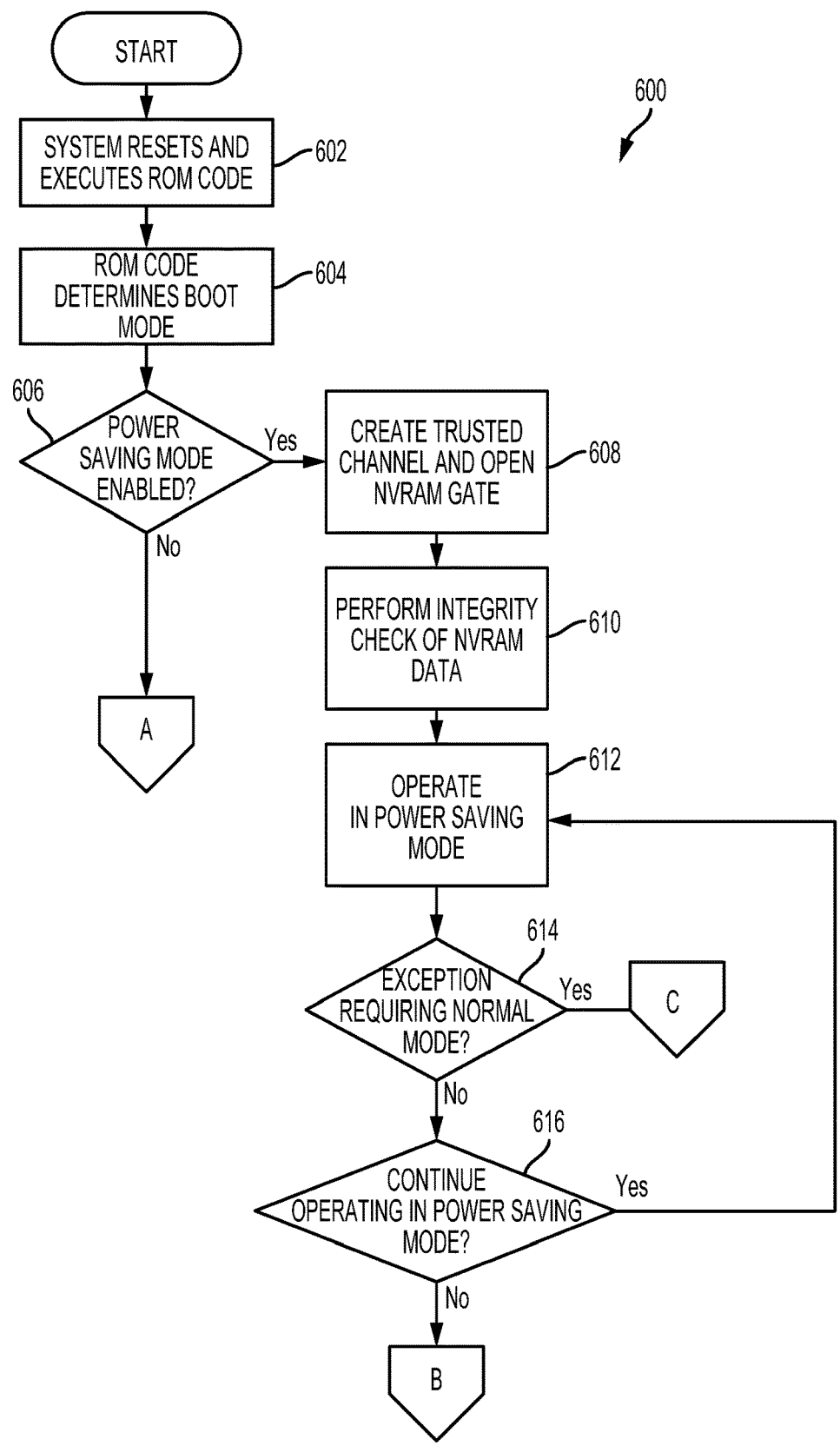
FIG. 6 is a process flow diagram illustrating a method of booting the SOC in an enhanced memory mode in accordance with an embodiment.

FIG. 6 illustrates a method 600 of booting the SOC 102 in an enhanced memory mode in accordance with an embodiment. With reference to FIGS. 1-6, the method 600 may be performed by a processor of a portable computing device and/or one or more components in the system 100 or SOC 102, such as the CPU 110, DSP 167, NVRAM component 104, fuses 132, etc. In the following description of FIG. 6, reference is made to a "processor" performing operations of the method 600 to generally encompass the various processors and/or circuits that may perform the method operations.

In block 602, the processor may cause the SOC 102 to reset and commence executing the trusted boot program 130 stored in the ROM component 114. As part of these operations, the SOC 102 may perform various operations to ascertain the stability of the SOC 102 and/or power up or initialize various subsystems or components included in the system 100 or SOC 102.

In block 604, the processor and/or the SOC 102 may receive an indication or information suitable for determining whether the SOC 102 should boot in normal mode or in enhanced memory mode. For example, in block 604, the processor and/or the SOC 102 may receive information from the flag component 148 in the power management controller 108 indicating that the SOC 102 should boot in normal mode (or in enhanced memory mode). As another example, the processor and/or the SOC 102 may receive the indication/information from the external AP 140 via a general-purpose input/output (GPIO) command. One of skill in the art will appreciate that the illustrative examples above only represent some of the many ways for the SOC executing the trusted boot program 130 to receive an indication as to whether to boot in the normal mode or in the enhanced memory mode.

In determination block 606, the processor and/or the SOC 102 may determine whether to boot the SOC in an enhance memory mode (e.g., power savings mode, etc.) based on the received indication/information.

In response to determining that the SOC should not boot in enhance memory mode (i.e., determination block 606="No"), the processor may perform the operations indicated after the callout block A illustrated in FIG. 5 (e.g., operations in blocks 502, 504, etc. as described above).

In response to determining that the SOC should boot in enhance memory mode (i.e., determination block 606="Yes"), the processor may create a secured channel (or trust channel), unlock or open the gate mechanism 172 (or NVRAM gate), and provide access to the NVRAM component 104 via the secured/trust channel in block 608.

One of skill in the art will understand that the SOC 102 may be configured in advance using the method 200 described with reference to FIG. 2 above. In such an embodiment, the NVRAM component 104 may be configured with a gate mechanism 172 operable to control access to the NVRAM component 104. The processor executing the method 600 may utilize the method 300 as described with reference to FIG. 3.

Once the gate mechanism 172 has been opened, the NVRAM component 104 may be accessed by the SOC 102 and the processor may perform an integrity check of the data stored in the NVRAM component 104 in block 610. In some embodiments, the NVRAM component 104 may contain data similar to the NVRAM data 407 as depicted in FIG. 4C and described above. In some embodiments, the NVRAM data 407 may be included in, or be configured in advance to execute within, the NVRAM component 104.

One of skill in the art will appreciate that the storage capacity of the NVRAM component 104 may be smaller than other memories located within the SOC 102 (e.g., the RAM component 105, the storage memory component 106, etc.). One of skill in the art will appreciate there are a number of mechanisms to shift data between various blocks of storage and/or memory. As such, one of skill in the art may develop a substantially similar method to ensure the capacity of the NVRAM component 104 is not exceeded while the SOC 102 is operating in the enhanced memory mode.

In block 612, the processor and/or the SOC 102 may commence operating in enhanced memory mode. While operating in the enhanced memory mode, unused subsystems within the SOC 102 may be powered down or placed in a sleep mode. In some embodiments, the RW #2-A portion 444 may be sufficient in capacity, latency, and/or power to perform the operations of the SOC 102 in which case the RAM controller 121 and the RAM component 105 may be powered down or placed in a sleep mode. In some embodiments, the storage memory controller 122 and the associated storage memory component 106 may be powered down or placed in a sleep mode while the SOC 102 operates in enhanced memory mode. One of skill in the art will appreciate the inherent power savings advantages of being able to operate the SOC 102 while many subsystems within the SOC 102 are powered down or put into a sleep state.

In determination block 614, the processor and/or the SOC 102 may determine whether there are any errors, conditions or exceptions that require the SOC 102 to return to operating in the normal (non-enhanced memory) mode.

In response to determining that there is an error, condition or exception that requires the SOC 102 to return to operating in the normal mode (i.e., determination block 614="Yes"), the processor and/or the SOC 102 may perform the operations of the method 500 indicated after the callout block C in FIG. 5 as described (e.g., operations in blocks 512, 514, etc.) to return the SOC to operating in the normal operating mode.

In response to determining that there are no errors, conditions or exceptions that require the SOC 102 to return to operating in the normal mode (i.e., determination block 614="No"), the processor and/or the SOC 102 may determine whether to continue operating in enhanced memory mode in determination block 616.

In response to determining that operations should continue in enhanced memory mode (i.e., determination block 616="Yes"), the processor and/or the SOC 102 may continue operating in enhanced memory mode in block 612.

In response to determining that operations should not continue in enhanced memory mode (i.e., determination block 616="No"), the processor and/or the SOC 102 may perform the operations of the method 500 indicated after the callout block B in FIG. 5 as described (e.g., operation in block 514, etc.). In some embodiments, the termination of the enhanced memory mode may be by operation of the user (e.g., the user powers down the computing device containing SOC 102).

Figure 7:
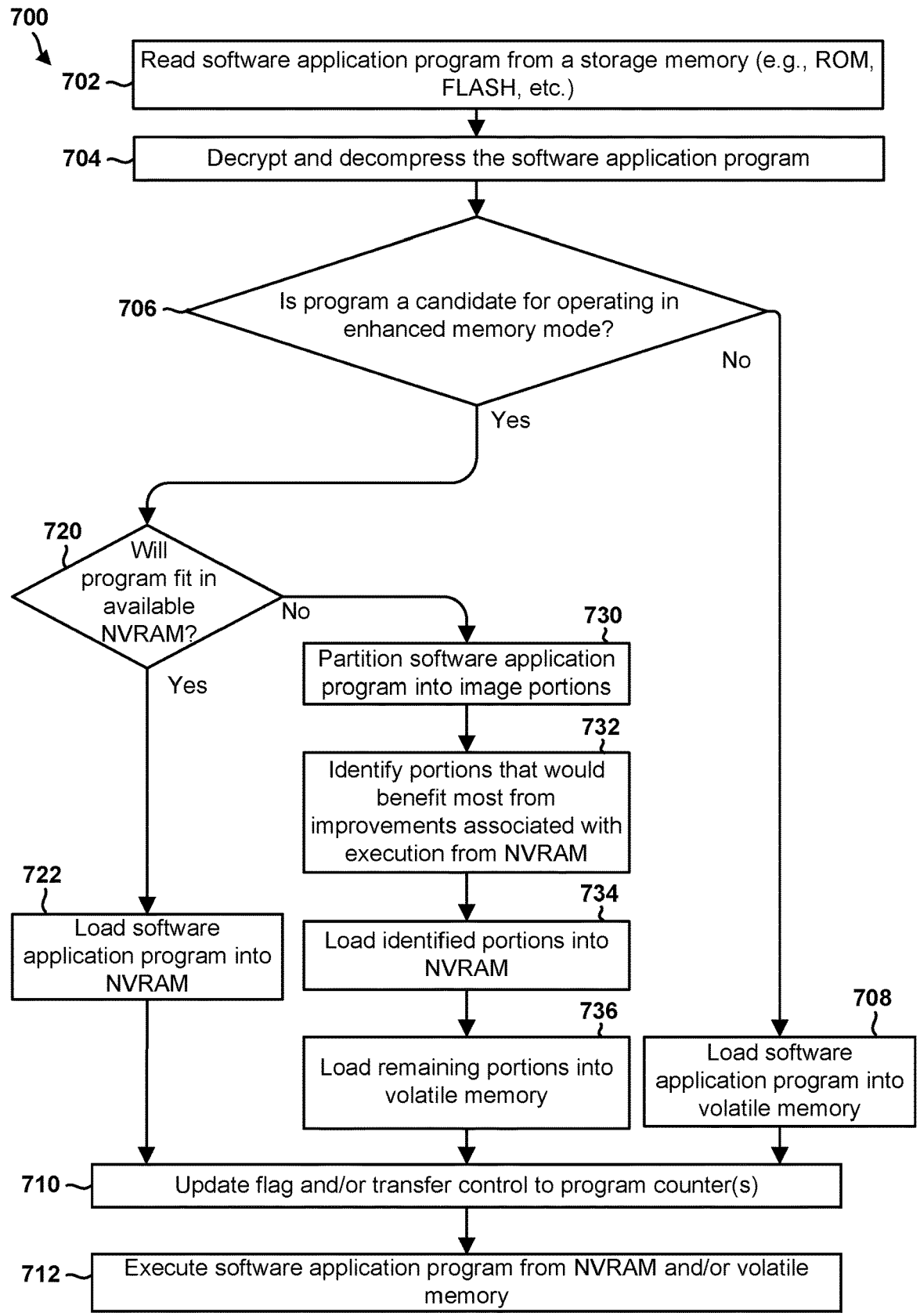
FIG. 7 is a process flow diagram illustrating a method of intelligently operating in enhanced memory mode in accordance with the various embodiments.

FIG. 7 illustrates a method 700 of intelligently of operating in enhanced memory mode in accordance with an embodiment. With reference to FIGS. 1-7, the method 700 may be performed by a processor of a portable computing device and/or one or more components in the system 100 or SOC 102, such as the CPU 110, DSP 167, NVRAM component 104, fuses 132, etc. In the following description of FIG. 7, reference is made to a "processor" performing operations of the method 700 to generally encompass the various processors and/or circuits that may perform the method operations.

In block 702, the processor may read a software application program from a storage memory (e.g., ROM, FLASH, etc.). In block 704, the processor may decrypt the software application program. In some embodiments, the processor may also decompress the software application program in block 704. For example, the processor may determine whether the software application program was compressed prior to encryption and storage, and decompress the software application program in block 704 in response to determining that the software application program was compressed prior to encryption and storage.

In determination block 706, the processor may determine whether the software application program is a candidate for operating in enhanced memory mode. For example, in determination block 706, the processor may determine whether the software application program would benefit from rapid bootup, rapid state-changes, low-power device operation, or high-speed code execution. In some embodiments, the processor may also determine whether the benefits are significant and/or outweigh the costs (in terms of performance, power consumption, etc.) of operating in enhanced memory mode in determination block 706.

For example, in determination block 706, the processor may retrieve or determine (e.g., via the operating system, etc.) a size value for the software application program, a power consumption value for the software application program, a performance value for the software application, and/or a boot time value for the software application program. The processor may determine an expense metric value based on the size value, the power consumption value, performance value and/or boot time value, and compare the expense metric value to a threshold value to determine whether the expense metric value exceeds the threshold value. The processor may determine that the benefits are outweigh the costs of operating in enhanced memory mode in determination block 706 in response to determining that the expense metric value does not meet or exceed the threshold value.

In some embodiments, the size value, the power consumption value, performance value and/or the boot time value may be a numeric value between zero (0) and nine (9). In some embodiments, the threshold value may be a numeric value between zero (0) and one hundred (100). In an embodiment, the processor may set the expense metric value equal to ((10*size value)+(5*power value)+(boot time value)). In an embodiment, the threshold value may be forty (40).

As a further example, in some embodiments, prior to performing the operations in determination block 706, the processor may identify candidate software application programs, categorize all candidate software application programs into one or more categories (e.g., low power, compact, high performance, special purpose, etc.), determine a worthiness value for each of the candidate software application programs (e.g., based on the size value, power consumption value, boot time value, the categories into which they are categorized, etc.), and generate a list of candidate software application programs based on the worthiness values. In determination block 706, the processor may determine whether the software application program is a candidate for operating in enhanced memory mode based on the worthiness values or information included in the list of candidate software application programs.

For example, the processor may generate the list of candidate software application programs to include only the software application programs that have a worthiness value that exceeds a threshold value, and determine that the software application program is a candidate for operating in enhanced memory mode in determination block 706 in response to determining that the software application program is included in the list of the candidate software application programs. As another example, the processor may generate a sorted or ordered list of candidate software application programs that organizes the software application programs based on their respective worthiness values, and determine that the software application program is a candidate for operating in enhanced memory mode in determination block 706 in response to determining that the software application program is the first, last, or most worthy candidate in the sorted or ordered list of candidate software application programs.

In response to determining that the software application is a not candidate for operating in enhanced memory mode (i.e., determination block 706="No"), the processor may load the software application program into volatile memory in block 708. The processor may determine that the software application is a not candidate for operating in enhanced memory mode in response to determining that the program would not benefit from rapid bootup, rapid state-changes, low-power device operation, or high-speed code execution. The processor may also determine that the software application is a not candidate for operating in enhanced memory mode in response to determining that the benefits are not significant, that the benefits do not outweigh the costs of operating in enhanced memory mode, or that that the expense metric value meets or exceeds the threshold value.

In block 710, the processor may update a flag (e.g., clear the enhanced memory mode indicator, etc.) and/or transfer control to the program counter. In block 712, the program counter and/or processor may begin executing the software application program from the volatile memory.

In response to determining that the software application program is a candidate for operating in enhanced memory mode (i.e., determination block 706="Yes"), the processor may determine the amount of NVRAM that is available for use and/or determine whether the entire software application program could be stored in the available NVRAM in determination block 720. The processor may determine that the software application program is a candidate for operating in enhanced memory mode in response to determining that the software application program would benefit from rapid bootup, rapid state-changes, low-power device operation, or high-speed code execution, that the benefits are significant, that the benefits outweigh the costs of operating in enhanced memory mode, and/or that the expense metric value does not meet or exceed the threshold value.

In response to determining that the entire software application program could be stored in the available NVRAM (i.e., determination block 720="Yes"), the processor may load the entire software application program into NVRAM in block 722. In block 710, the processor may set a flag (e.g., the enhanced memory mode indicator, etc.) and/or transfer control to the program counter. In block 712, the program counter and/or processor may begin executing the software application program from the NVRAM.

In response to determining that the available NVRAM is not large enough to store the entire software application program (i.e., determination block 720="No"), the processor may partition software application program into image portions (or a plurality of software images) in block 730.

In block 732, the processor may identify image portions for loading into the NVRAM. In some embodiments, the processor may determine the image portions that would exhibit performance improvements when executed from NVRAM (e.g., rapid bootup, rapid state-changes, low-power device operation, high-speed code execution, etc.). In some embodiments, the processor may prioritize image portions based upon performance improvements that may be achieved executed from NVRAM and identify image portions for loading into the NVRAM based upon priority. Thus, in some embodiments, the processor may identify the image portions that would exhibit the most performance improvements when executed from NVRAM. In some embodiments, the processor may determine the image portions that would exhibit the greatest performance improvements or that would benefit the most from improvements associated with execution from NVRAM in block 732 by, for example, determining whether an expense metric value exceeds a threshold value.

In block 734, the processor may load identified image portions into NVRAM. In block 736, the processor may load the remaining image portions into volatile memory.

In block 710, the processor may set the flag (e.g., the enhanced memory mode indicator, etc.) and/or transfer control to one or more program counter(s). In block 712, the program counter(s) and/or processor may begin executing the portions from the NVRAM and volatile memory.

In some embodiments, a computing device, SOC, or processor may be configured to intelligently determine whether to operate in the enhanced memory mode by reading a software application program from a storage memory of the computing device, and determining whether the software application program is a candidate for operating in an enhanced memory mode. The computing device may load the software application program into volatile memory, and clear an enhanced memory mode indicator in response to determining that the software application program is not a candidate for operating in the enhanced memory mode. On the other hand, in response to determining that the software application program is a candidate for operating in the enhanced memory mode, the computing device may create a trusted channel to the NVRAM, load the software application program into the NVRAM, and set the enhanced memory mode indicator.

After the computing device reboots (or enters and exits a sleep state, etc.), the computing device may determine whether the enhanced memory mode indicator is set. The computing device may transfer control to the program counter to commence executing the software application program from the volatile memory in response to determining that the enhanced memory mode indicator is not set (i.e., the indicated was cleared prior to the reboot). The computing device may transfer control to a program counter to commence executing the software application program from the NVRAM in response to determining that the enhanced memory mode indicator is set (i.e., the indicated was set prior to the reboot).

In some embodiments, the computing device may be configured to determine whether a software application program is a candidate for an enhanced memory mode by evaluating the software application program to generate evaluation results. The computing device may determine that the software application program is a candidate for the enhanced memory mode in response to determining, based on the evaluation results, that the software application program would benefit from rapid bootup, rapid state-changes, low-power device operation, or high-speed code execution.

In some embodiments, the computing device (SOC, etc.) may be configured to determine whether a software application program is a candidate for an enhanced memory mode by determining a size value for the software application program, determining a power consumption value for the software application program, determining a boot time value for the software application program, and determining an expense metric value based on the size value, the power consumption value, and the boot time value. The computing device may determine that the software application program is not a candidate for the enhanced memory mode in response to determining that the expense metric value exceeds the threshold value. On the other hand, the computing device may determine that the software application program is a candidate for the enhanced memory mode in response to determining that the expense metric value does not exceed the threshold value.

The computing device may load the software application program into volatile memory in response to determining that the software application program is not a candidate for the enhanced memory mode. The computing device may load the software application program into NVRAM and set an enhanced memory mode indicator operable to enable a subsequent boot of the computing device in the enhanced memory mode in response to determining that the software application program is a candidate for the enhanced memory mode.

After rebooting, the computing device may determine whether the enhanced memory mode indicator is set. The computing device may commence execution of the software application program from the NVRAM (and thus operate in enhanced memory mode) in response to determining that the enhanced memory mode indicator is set. On the other hand, the computing device may commence execution of the software application program from the volatile memory in response to determining that the enhanced memory mode indicator is not set.

The various embodiments may include methods of operating a computing system/device (SOC, etc.), which may include determining whether a software application program is a candidate for an enhanced memory mode, loading the software application program into NVRAM and setting an enhanced memory mode indicator operable to enable a subsequent boot of the computing system/device in the enhanced memory mode in response to determining that the software application program is a candidate for the enhanced memory mode, determining whether the enhanced memory mode indicator is set after rebooting the computing system/device, and operating the computing system/device in the enhanced memory mode by commencing execution of the software application program from the NVRAM in response to determining that the enhanced memory mode indicator is set.

In an embodiment, the method may include loading the software application program into volatile memory in response to determining that the software application program is not a candidate for the enhanced memory mode, and commencing execution of the software application program from the volatile memory in response to determining that the enhanced memory mode indicator is not set. In a further embodiment, determining whether the software application program is a candidate for the enhanced memory mode may include evaluating the software application program to generate evaluation results, determining whether the software application program would benefit from rapid bootup, rapid state-changes, low-power device operation, or high-speed code execution based on the evaluation results, and determining that the software application program is a candidate for the enhanced memory mode in response to determining that the software application program would benefit from rapid bootup, rapid state-changes, low-power device operation, or high-speed code execution.

In a further embodiment, determining whether the software application program is a candidate for the enhanced memory mode may include determining a size value for the software application program, determining a power consumption value for the software application program, determining a boot time value for the software application program, determining an expense metric value based on the size value, the power consumption value, and the boot time value, determining whether the expense metric value exceeds a threshold value, determining that the software application program is not a candidate for the enhanced memory mode in response to determining that the expense metric value exceeds the threshold value, and determining that the software application program is a candidate for the enhanced memory mode in response to determining that the expense metric value does not exceed the threshold value.

In a further embodiment, the method may include identifying a plurality of candidate software application programs, categorizing each of identified software application programs into one or more categories, determining a worthiness value for each of the identified software application programs based on the one or more categories associated with each identified software application program, and inserting one or more of the identified software application programs into a list of candidate software application programs based on their respective worthiness values, in which determining whether the software application program is a candidate for the enhanced memory mode may include determining whether the software application program is a candidate for operating in the enhanced memory mode based on information included in the list of candidate software application programs.

In a further embodiment, inserting one or more of the identified software application programs into the list of candidate software application programs based on their respective worthiness values may include inserting the identified software application programs into an ordered list of candidate software application programs that organizes the identified software application programs based on their associated worthiness values. In a further embodiment, inserting one or more of the identified software application programs into the list of candidate software application programs based on their respective worthiness values may include determining whether the worthiness value associated with an identified software application program exceeds a threshold value, and inserting the identified software application program into the list of candidate software application programs in response to determining that the worthiness value associated with the identified software application program exceeds the threshold value.

In a further embodiment, determining whether the software application program is a candidate for operating in the enhanced memory mode based on information included in the list of candidate software application programs may include determining whether the software application program is included in the list of candidate software application programs. In a further embodiment, setting the enhanced memory mode indicator operable to enable the subsequent boot of the computing system/device in the enhanced memory mode may include storing a flag in a non-volatile memory. In a further embodiment, setting the enhanced memory mode indicator operable to enable the subsequent boot of the computing system/device in the enhanced memory mode may include setting one of a low power mode indicator, a rapid boot time mode indicator, a rapid state-transition mode indicator, or a high-speed execution mode indicator.

In a further embodiment, determining whether the enhanced memory mode indicator is set after rebooting the computing system/device may include executing a trusted boot program to securely determine a presence of the enhanced memory mode indicator. In a further embodiment, the method may include sending the enhanced memory mode indicator to a system-on-chip of the computing system/device from a component external to the system-on-chip. In a further embodiment, the method may include receiving an exception indicating that the computing system/ device should exit the enhanced memory mode, and operating the computing system/device in a non-enhanced memory mode in response to receiving the exception.

In a further embodiment, loading the software application program into the NVRAM may include loading a software image from a storage memory into the NVRAM, the software image being configured to execute within the NVRAM. In a further embodiment, the method may include partitioning the software application program into a plurality of software images, in which loading the software application program into the NVRAM may include loading a subset of the plurality of software images into the NVRAM. In a further embodiment, the method may include identifying a software image in the plurality of software images that would benefit most from improvements associated with execution in NVRAM, and loading the subset of the plurality of software images into the NVRAM may include loading the identified software image into the NVRAM.

Further embodiments may include a computing system/device (SOC, etc.) that includes a NVRAM, and a processor coupled to the NVRAM, in which the processor is configured with processor-executable instructions to perform operations that may include determining whether a software application program is a candidate for an enhanced memory mode, loading the software application program into the NVRAM and setting an enhanced memory mode indicator operable to enable a subsequent boot of the computing system/device in the enhanced memory mode in response to determining that the software application program is a candidate for the enhanced memory mode, determining whether the enhanced memory mode indicator is set after rebooting the computing system/device, and operating the computing system/device in the enhanced memory mode by commencing execution of the software application program from the NVRAM in response to determining that the enhanced memory mode indicator is set.

In an embodiment, the processor may be configured with processor-executable instructions to perform operations further including loading the software application program into volatile memory in response to determining that the software application program is not a candidate for the enhanced memory mode, and commencing execution of the software application program from the volatile memory in response to determining that the enhanced memory mode indicator is not set.

In a further embodiment, the processor may be configured with processor-executable instructions to perform operations such that determining whether the software application program is a candidate for the enhanced memory mode includes evaluating the software application program to generate evaluation results, determining whether the software application program would benefit from rapid bootup, rapid state-changes, low-power device operation, or high-speed code execution based on the evaluation results, in which determining that the software application program is a candidate for the enhanced memory mode in response to determining that the software application program would benefit from rapid bootup, rapid state-changes, low-power device operation, or high-speed code execution.

In a further embodiment, the processor may be configured with processor-executable instructions to perform operations such that determining whether the software application program is a candidate for the enhanced memory mode includes determining a size value for the software application program, determining a power consumption value for the software application program, determining a boot time value for the software application program, determining an expense metric value based on the size value, the power consumption value, and the boot time value, determining whether the expense metric value exceeds a threshold value, determining that the software application program is not a candidate for the enhanced memory mode in response to determining that the expense metric value exceeds the threshold value, and determining that the software application program is a candidate for the enhanced memory mode in response to determining that the expense metric value does not exceed the threshold value.

In a further embodiment, the processor may be configured with processor-executable instructions to perform operations further including identifying a plurality of candidate software application programs, categorizing each of identified software application programs into one or more categories, determining a worthiness value for each of the identified software application programs based on the one or more categories associated with each identified software application program, and inserting one or more of the identified software application programs into a list of candidate software application programs based on their respective worthiness values. In a further embodiment, processor may be configured with processor-executable instructions to perform operations such that determining whether the software application program is a candidate for the enhanced memory mode includes determining whether the software application program is a candidate for operating in the enhanced memory mode based on information included in the list of candidate software application programs.

In a further embodiment, the processor may be configured with processor-executable instructions to perform operations such that inserting one or more of the identified software application programs into the list of candidate software application programs based on their respective worthiness values includes inserting the identified software application programs into an ordered list of candidate software application programs that organizes the identified software application programs based on their associated worthiness values.

In a further embodiment, the processor may be configured with processor-executable instructions to perform operations such that inserting one or more of the identified software application programs into the list of candidate software application programs based on their respective worthiness values includes determining whether the worthiness value associated with an identified software application program exceeds a threshold value, and inserting the identified software application program into the list of candidate software application programs in response to determining that the worthiness value associated with the identified software application program exceeds the threshold value. In an embodiment, the processor may be configured with processor-executable instructions to perform operations such that determining whether the software application program is a candidate for operating in the enhanced memory mode based on information included in the list of candidate software application programs includes determining whether the software application program is included in the list of candidate software application programs.

In a further embodiment, the processor may be configured with processor-executable instructions to perform operations such that setting the enhanced memory mode indicator operable to enable the subsequent boot of the computing system/device in the enhanced memory mode includes storing a flag in a non-volatile memory. In a further embodiment, the processor may be configured with processor-executable instructions to perform operations such that setting the enhanced memory mode indicator operable to enable the subsequent boot of the computing system/device in the enhanced memory mode includes setting one of a low power mode indicator, a rapid boot time mode indicator, a rapid state-transition mode indicator, or a high-speed execution mode indicator.

In a further embodiment, the processor may be configured with processor-executable instructions to perform operations such that determining whether the enhanced memory mode indicator is set after rebooting the computing system/device includes executing a trusted boot program to securely determine a presence of the enhanced memory mode indicator. In a further embodiment, the processor may be configured with processor-executable instructions to perform operations further including sending the enhanced memory mode indicator to a system-on-chip of the computing system/device from a component external to the system-on-chip. In a further embodiment, the processor may be configured with processor-executable instructions to perform operations further including receiving an exception indicating that the computing system/device should exit the enhanced memory mode, and operating the computing system/device in a non-enhanced memory mode in response to receiving the exception.

In a further embodiment, the processor may be configured with processor-executable instructions to perform operations such that loading the software application program into the NVRAM includes loading a software image from a storage memory into the NVRAM, the software image being configured to execute within the NVRAM.

In a further embodiment, the processor may be configured with processor-executable instructions to perform operations further including partitioning the software application program into a plurality of software images. In a further embodiment, the processor may be configured with processor-executable instructions to perform operations such that loading the software application program into the NVRAM includes loading a subset of the plurality of software images into the NVRAM.

In a further embodiment, the processor may be configured with processor-executable instructions to perform operations further including identifying a software image in the plurality of software images that would benefit most from improvements associated with execution in NVRAM. In a further embodiment, the processor may be configured with processor-executable instructions to perform operations such that loading the subset of the plurality of software images into the NVRAM includes loading the identified software image into the NVRAM.

Further embodiments may include a non-transitory computer readable storage medium having stored thereon processor-executable software instructions configured to cause a processor to perform operations for operating a computing system/device (SOC, etc.), the operations including determining whether a software application program is a candidate for an enhanced memory mode, loading the software application program into NVRAM and setting an enhanced memory mode indicator operable to enable a subsequent boot of the computing system/device in the enhanced memory mode in response to determining that the software application program is a candidate for the enhanced memory mode, determining whether the enhanced memory mode indicator is set after rebooting the computing system/device, and operating the computing system/device in the enhanced memory mode by commencing execution of the software application program from the NVRAM in response to determining that the enhanced memory mode indicator is set.

In an embodiment, the processor may be configured with processor-executable instructions to perform operations further including loading the software application program into volatile memory in response to determining that the software application program is not a candidate for the enhanced memory mode, and commencing execution of the software application program from the volatile memory in response to determining that the enhanced memory mode indicator is not set.

In a further embodiment, the processor may be configured with processor-executable instructions to perform operations such that determining whether the software application program is a candidate for the enhanced memory mode includes evaluating the software application program to generate evaluation results, determining whether the software application program would benefit from rapid bootup, rapid state-changes, low-power device operation, or high-speed code execution based on the evaluation results, and determining that the software application program is a candidate for the enhanced memory mode in response to determining that the software application program would benefit from rapid bootup, rapid state-changes, low-power device operation, or high-speed code execution.

In a further embodiment, the processor may be configured with processor-executable instructions to perform operations such that determining whether the software application program is a candidate for the enhanced memory mode includes determining a size value for the software application program, determining a power consumption value for the software application program, determining a boot time value for the software application program, determining an expense metric value based on the size value, the power consumption value, and the boot time value, determining whether the expense metric value exceeds a threshold value, determining that the software application program is not a candidate for the enhanced memory mode in response to determining that the expense metric value exceeds the threshold value, and determining that the software application program is a candidate for the enhanced memory mode in response to determining that the expense metric value does not exceed the threshold value.

In a further embodiment, the processor may be configured with processor-executable instructions to perform operations further including identifying a plurality of candidate software application programs, categorizing each of identified software application programs into one or more categories, determining a worthiness value for each of the identified software application programs based on the one or more categories associated with each identified software application program, and inserting one or more of the identified software application programs into a list of candidate software application programs based on their respective worthiness values.

In a further embodiment, the processor may be configured with processor-executable instructions to perform operations such that determining whether the software application program is a candidate for the enhanced memory mode includes determining whether the software application program is a candidate for operating in the enhanced memory mode based on information included in the list of candidate software application programs. In a further embodiment, the processor may be configured with processor-executable instructions to perform operations such that inserting one or more of the identified software application programs into the list of candidate software application programs based on their respective worthiness values includes inserting the identified software application programs into an ordered list of candidate software application programs that organizes the identified software application programs based on their associated worthiness values. In a further embodiment, the processor may be configured with processor-executable instructions to perform operations such that inserting one or more of the identified software application programs into the list of candidate software application programs based on their respective worthiness values includes determining whether the worthiness value associated with an identified software application program exceeds a threshold value, and inserting the identified software application program into the list of candidate software application programs in response to determining that the worthiness value associated with the identified software application program exceeds the threshold value.

In a further embodiment, the processor may be configured with processor-executable instructions to perform operations such that determining whether the software application program is a candidate for operating in the enhanced memory mode based on information included in the list of candidate software application programs includes determining whether the software application program is included in the list of candidate software application programs. In a further embodiment, the processor may be configured with processor-executable instructions to perform operations such that setting the enhanced memory mode indicator operable to enable the subsequent boot of the computing system/device in the enhanced memory mode includes storing a flag in a non-volatile memory. In a further embodiment, the processor may be configured with processor-executable instructions to perform operations such that setting the enhanced memory mode indicator operable to enable the subsequent boot of the computing system/device in the enhanced memory mode includes setting one of a low power mode indicator, a rapid boot time mode indicator, a rapid state-transition mode indicator, or a high-speed execution mode indicator.

In a further embodiment, the processor may be configured with processor-executable instructions to perform operations such that determining whether the enhanced memory mode indicator is set after rebooting the computing system/device includes executing a trusted boot program to securely determine a presence of the enhanced memory mode indicator. In a further embodiment, the processor may be configured with processor-executable instructions to perform operations further including sending the enhanced memory mode indicator to a system-on-chip of the computing system/device from a component external to the system-on-chip. In a further embodiment, the processor may be configured with processor-executable instructions to perform operations further including receiving an exception indicating that the computing system/device should exit the enhanced memory mode, and operating the computing system/device in a non-enhanced memory mode in response to receiving the exception.

In a further embodiment, the processor may be configured with processor-executable instructions to perform operations such that loading the software application program into the NVRAM includes loading a software image from a storage memory into the NVRAM, the software image being configured to execute within the NVRAM.

In a further embodiment, the processor may be configured with processor-executable instructions to perform operations further including partitioning the software application program into a plurality of software images. In a further embodiment, the processor may be configured with processor-executable instructions to perform operations such that loading the software application program into the NVRAM includes loading a subset of the plurality of software images into the NVRAM.

In a further embodiment, the processor may be configured with processor-executable instructions to perform operations further including identifying a software image in the plurality of software images that would benefit most from improvements associated with execution in NVRAM. In a further embodiment, the processor may be configured with processor-executable instructions to perform operations such that loading the subset of the plurality of software images into the NVRAM includes loading the identified software image into the NVRAM.

Further embodiments may include a computing system/device (e.g., SOC, etc.) that includes means for determining whether a software application program is a candidate for an enhanced memory mode, means for loading the software application program into NVRAM and setting an enhanced memory mode indicator operable to enable a subsequent boot of the computing system/device in the enhanced memory mode in response to determining that the software application program is a candidate for the enhanced memory mode, means for determining whether the enhanced memory mode indicator is set after rebooting the computing system/device, and means for operating the computing system/device in the enhanced memory mode by commencing execution of the software application program from the NVRAM in response to determining that the enhanced memory mode indicator is set.

In an embodiment, the computing system/device may include means for loading the software application program into volatile memory in response to determining that the software application program is not a candidate for the enhanced memory mode, and means for commencing execution of the software application program from the volatile memory in response to determining that the enhanced memory mode indicator is not set. In a further embodiment means for determining whether the software application program is a candidate for the enhanced memory mode may include means for evaluating the software application program to generate evaluation results, means for determining whether the software application program would benefit from rapid bootup, rapid state-changes, low-power device operation, or high-speed code execution based on the evaluation results, and means for determining that the software application program is a candidate for the enhanced memory mode in response to determining that the software application program would benefit from rapid bootup, rapid state-changes, low-power device operation, or high-speed code execution.

In a further embodiment means for determining whether the software application program is a candidate for the enhanced memory mode may include means for determining a size value for the software application program, means for determining a power consumption value for the software application program, means for determining a boot time value for the software application program, means for determining an expense metric value based on the size value, the power consumption value, and the boot time value, means for determining whether the expense metric value exceeds a threshold value, means for determining that the software application program is not a candidate for the enhanced memory mode in response to determining that the expense metric value exceeds the threshold value, and means for determining that the software application program is a candidate for the enhanced memory mode in response to determining that the expense metric value does not exceed the threshold value. In an embodiment, the computing system/device may include means for identifying a plurality of candidate software application programs, means for categorizing each of identified software application programs into one or more categories, means for determining a worthiness value for each of the identified software application programs based on the one or more categories associated with each identified software application program, and means for inserting one or more of the identified software application programs into a list of candidate software application programs based on their respective worthiness values, in which means for determining whether the software application program is a candidate for the enhanced memory mode may include means for determining whether the software application program is a candidate for operating in the enhanced memory mode based on information included in the list of candidate software application programs.

In a further embodiment means for inserting one or more of the identified software application programs into the list of candidate software application programs based on their respective worthiness values may include means for inserting the identified software application programs into an ordered list of candidate software application programs that organizes the identified software application programs based on their associated worthiness values.

In a further embodiment means for inserting one or more of the identified software application programs into the list of candidate software application programs based on their respective worthiness values may include means for determining whether the worthiness value associated with an identified software application program exceeds a threshold value, and means for inserting the identified software application program into the list of candidate software application programs in response to determining that the worthiness value associated with the identified software application program exceeds the threshold value.

In a further embodiment means for determining whether the software application program is a candidate for operating in the enhanced memory mode based on information included in the list of candidate software application programs may include means for determining whether the software application program is included in the list of candidate software application programs. In a further embodiment means for setting the enhanced memory mode indicator operable to enable the subsequent boot of the computing system/device in the enhanced memory mode may include means for storing a flag in a non-volatile memory.

In a further embodiment means for setting the enhanced memory mode indicator operable to enable the subsequent boot of the computing system/device in the enhanced memory mode may include means for setting one of a low power mode indicator, a rapid boot time mode indicator, a rapid state-transition mode indicator, or a high-speed execution mode indicator. In a further embodiment means for determining whether the enhanced memory mode indicator is set after rebooting the computing system/device may include means for executing a trusted boot program to securely determine a presence of the enhanced memory mode indicator. In an embodiment, the computing system/device may include means for sending the enhanced memory mode indicator to a system-on-chip of the computing system/device from a component external to the system-on-chip. In an embodiment, the computing system/device may include means for receiving an exception indicating that the computing system/device should exit the enhanced memory mode, and means for operating the computing system/device in a non-enhanced memory mode in response to receiving the exception.

In a further embodiment, means for loading the software application program into the NVRAM may include means for loading a software image from a storage memory into the NVRAM, the software image being configured to execute within the NVRAM.

In a further embodiment, the computing system/device may include means for partitioning the software application program into a plurality of software images. In a further embodiment means for loading the software application program into the NVRAM may include means for loading a subset of the plurality of software images into the NVRAM.

In a further embodiment, the computing system/device may include means for identifying a software image in the plurality of software images that would benefit most from improvements associated with execution in NVRAM. In a further embodiment means for loading the subset of the plurality of software images into the NVRAM may include means for loading the identified software image into the NVRAM.

The various embodiments may include methods for booting a system-on-chip ("SOC") in a power saving mode that include reading a power saving mode indicator, creating a trusted channel to the NVRAM (the NVRAM logically connected to the SOC and the NVRAM being secured prior to the creation of the trusted channel), operating the SOC in a power saving mode, and storing an indicator operable to enable a subsequent boot of the SOC in the power saving mode. In some embodiments, the power saving mode indicator may be a flag stored in a power management controller. In some embodiments, the method may include sending the power saving mode indicator to the SOC from a device external to the SOC. In some embodiments, the method may include receiving an exception indicating the SOC should exit power saving mode, and operating the SOC in a normal mode in response to receiving the exception. In some embodiments, a trusted boot program may securely determine the presence of the power saving mode indicator. In some embodiments, operating the SOC in the power saving mode may include loading a software image from a storage memory into the NVRAM, the software image being configured to execute within the NVRAM. In some embodiments, the software image may include a subset of a plurality of software images stored on the storage device, the plurality of software images providing substantially alternative functionality than the software image operating in the power saving mode.

Various embodiments may include methods for booting a system-on-chip ("SOC") in a power saving mode, including reading a power saving mode indicator, creating a trusted channel to the NVRAM (the NVRAM logically connected to the SOC and the NVRAM being secured prior to the creation of the trusted channel), operating the SOC in a power saving mode, and storing an indicator operable to enable a subsequent boot of the SOC in the power saving mode. In some embodiments, the power saving mode indicator may be a flag stored in a power management controller. In some embodiments, the method may include sending the power saving mode indicator to the SOC from a device external to the SOC.

In some embodiments, the method may include receiving an exception indicating the SOC should exit power saving mode, and operating the SOC in a normal mode in response to receiving the exception. In some embodiments, a trusted boot program may securely determine the presence of the power saving mode indicator. In some embodiments, operating the SOC in the power saving mode may include loading a software image from a storage memory into the NVRAM, the software image being configured to execute within the NVRAM. In some embodiments, the software image may include a subset of a plurality of software images stored on the storage device, the plurality of software images providing substantially alternative functionality than the software image operating in the power saving mode.

Various embodiments may include a system-on-chip ("SOC") that is configured to operate in a power saving mode, the SOC including means for reading a power saving mode indicator, means for creating a trusted channel to a NVRAM (the NVRAM logically connected to the SOC and the NVRAM being secured prior to the creation of the trusted channel), means for operating the SOC in a power saving mode, and means for storing an indicator operable to enable a subsequent boot of the SOC in the power saving mode. In some embodiments, the power saving mode indicator may be a flag stored in a power management controller. In some embodiments, the SOC may include means for sending the power saving mode indicator to the SOC from a device external to the SOC. In some embodiments, the SOC may include means for receiving an exception, the exception indicating the SOC should exit power saving mode, and means for operating the SOC in a normal mode in response to receiving the exception. In some embodiments, a trusted boot program securely determines the presence of the power saving mode indicator. In some embodiments, means for operating the SOC in the power saving mode further includes means for loading a software image from a storage memory into the NVRAM, the software image being configured to execute within the NVRAM. In some embodiments, the software image includes a subset of a plurality of software images stored on the storage device, the plurality of software images providing substantially alternative functionality than the software image operating in the power saving mode.

Further embodiments may include a non-transitory processor-readable storage medium having stored thereon processor-executable instructions configured to cause a processor to perform operations relating to a power saving mode, the operations that include reading a power saving mode indicator, creating a trusted channel to a NVRAM (the NVRAM logically connected to the SOC and the NVRAM being secured prior to the creation of the trusted channel), operating the SOC in a power saving mode, and storing an indicator operable to enable a subsequent boot of the SOC in the power saving mode. In some embodiments, the stored processor-executable instructions may be configured to cause a processor to perform operations relating to a power saving mode, in which the power saving mode indicator is a flag stored in a power management controller. In some embodiments, the stored processor-executable instructions may be configured to cause a processor to perform operations relating to a power saving mode that include sending the power saving mode indicator to the SOC from a device external to the SOC. In some embodiments, the stored processor-executable instructions may be configured to cause a processor to perform operations relating to a power saving mode that include receiving an exception, the exception indicating the SOC should exit power saving mode, and operating the SOC in a normal mode. In some embodiments, the stored processor-executable instructions may be configured such that a trusted boot program securely determines the presence of the power saving mode indicator. In some embodiments, the stored processor-executable instructions may be configured to cause a processor to perform operations relating to a power saving mode that include loading a software image from a storage memory into the NVRAM, the software image being configured to execute within the NVRAM. In some embodiments, the stored processor-executable instructions may be configured to cause a processor to perform operations such that the software image includes a subset of a plurality of software images stored on the storage device, the plurality of software images providing substantially alternative functionality than the software image operating in the power saving mode.

Further embodiments may include a system-on-chip ("SOC") configured to operate in a power saving mode, the SOC including a storage device, a NVRAM, and a processor configured to perform operations that include reading a power saving mode indicator, creating a trusted channel to the NVRAM (the NVRAM logically connected to the SOC and the NVRAM being secured prior to the creation of the trusted channel), operating the SOC in a power saving mode, and storing an indicator operable to enable a subsequent boot of the SOC in the power saving mode. In some embodiments, the power saving mode indicator may be a flag stored in a power management controller. In some embodiments, the processor or SOC may be configured to perform operations that include sending the power saving mode indicator to the SOC from a device external to the SOC. In some embodiments, the SOC may be configured to perform operations that include receiving an exception, the exception indicating the SOC should exit power saving mode, and operating the SOC in a normal mode in response to receiving the exception. In some embodiments, the SOC may be configured to perform operations such that a trusted boot program securely determines the presence of the power saving mode indicator. In some embodiments, the SOC may be configured to perform operations such that operating the SOC in the power saving mode further includes loading a software image from a storage memory into the NVRAM, the software image being configured to execute within the NVRAM. In some embodiments, the SOC may be configured to perform operations such that the software image includes a subset of a plurality of software images stored on the storage device, the plurality of software images providing substantially alternative functionality than the software image operating in the power saving mode. In some embodiments, the processor may be a digital signal processor ("DSP"), a graphics processing unit ("GPU"), a central processing unit ("CPU"), or an application-specific integrated circuit ("ASIC"). In some embodiments, the SOC may be integrated into a portable computing device.

Figure 8:
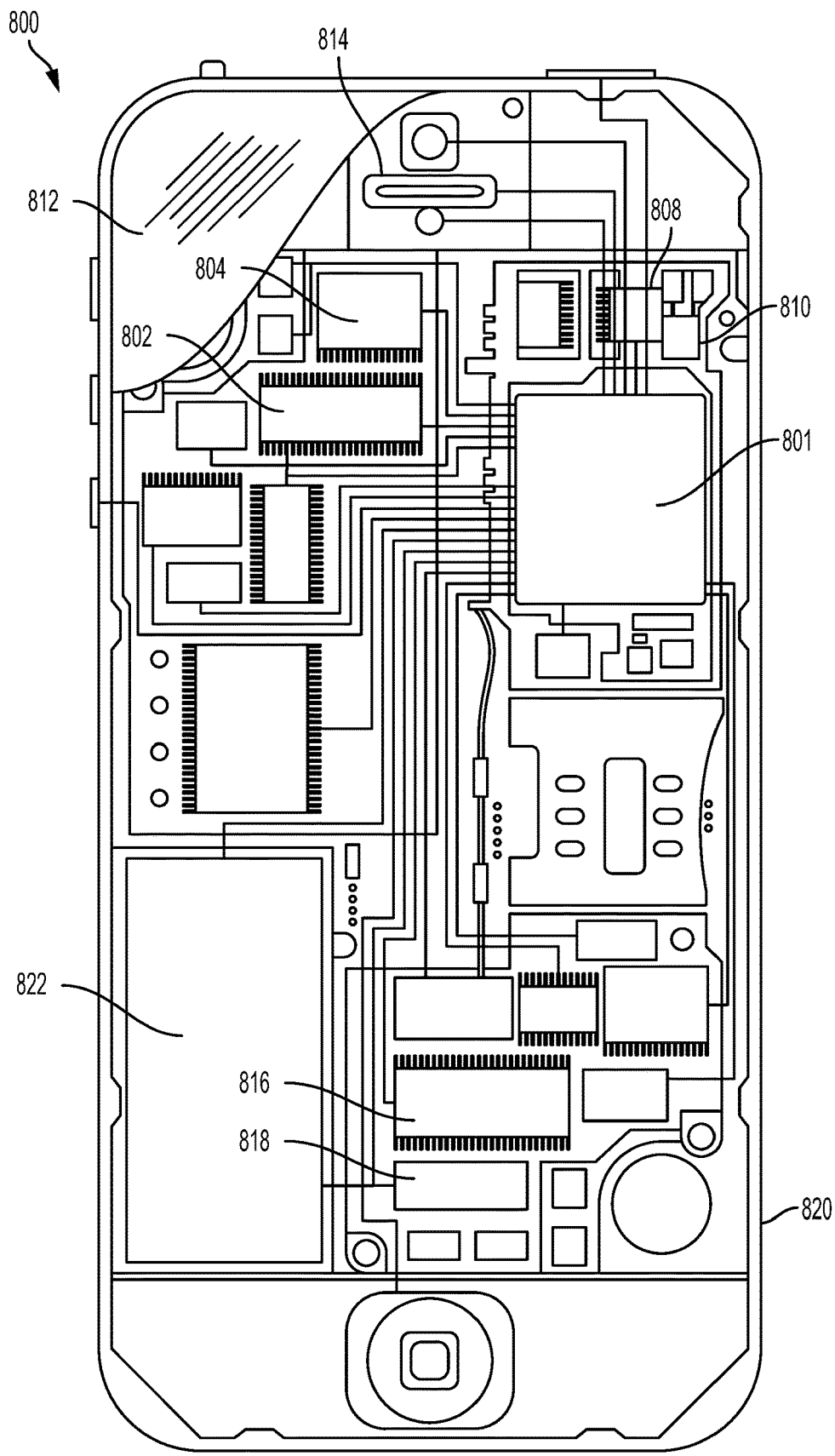
FIG. 8 is a block diagram of an aspect of a portable computing device for incorporating the system and method described herein.

The various embodiments (including, but not limited to, embodiments discussed above with reference to FIGS. 1 through 7) may be implemented in any of a variety of the computing system/devices including a mobile device 800, an example of which is illustrated in FIG. 8. As such, the mobile device 800 may implement the processes 500, 600 and/or 700 in FIGS. 5, 6 and/or 7. For example, the mobile device 800 may include a processor 801 coupled to a touch screen controller 804 and an internal memory 802. The processor 801 may be one or more multicore integrated circuits (ICs) designated for general or specific processing tasks. In some embodiments, the processor 801 may be substantially the same as SOC 102 described above. The internal memory 802 may be volatile or non-volatile memory, and may also be secure and/or encrypted memory, or unsecure and/or unencrypted memory, or any combination thereof. The touch screen controller 804 and the processor 801 may also be coupled to a touch screen panel 812, such as a resistive-sensing touch screen, capacitive-sensing touch screen, infrared sensing touch screen, etc.

The mobile device 800 may have one or more radio signal transceivers 808 (e.g., Peanut®, Bluetooth®, Zigbee®, Wi-Fi, RF, cellular, etc.) and antennae 810, for sending and receiving, coupled to each other and/or to the processor 801. The transceivers 808 and antennae 810 may be used with the above-mentioned circuitry to implement various wireless transmission protocol stacks and interfaces and to establish the various wireless links discussed herein. The mobile device 800 may include one or more cellular network wireless modem chips 816, such as one cellular network wireless modem chip, two cellular network wireless modem chips, three cellular network wireless modem chips, four cellular network wireless modem chips, or more than four cellular network wireless modem chips, that enables communication via one or more cellular networks and that are coupled to the processor 801. The one or more cellular network wireless modem chips 816 may enable the mobile device 800 to receive services from one or more cellular networks (e.g., CDMA, TDMA, GSM, 3G, 4G, 5G, LTE, or any other type of cellular network), to implement various wireless transmission protocol stacks and interfaces, and to establish the various wireless links discussed herein.

The mobile device 800 may include a peripheral device connection interface 818 coupled to the processor 801. The peripheral device connection interface 818 may be singularly configured to accept one type of connection, or multiply configured to accept various types of physical and communication connections, common or proprietary, such as USB, FireWire, Thunderbolt, Ethernet, or PCIe. The peripheral device connection interface 818 may also be coupled to a similarly configured peripheral device connection port (not illustrated). The mobile device 800 may also include speakers 814 for providing audio outputs.

The mobile device 800 may also include a housing 820, constructed of a plastic, metal, or a combination of materials, for containing all or some of the components discussed herein. The mobile device 800 may include a power source 822 coupled to the processor 801, such as a disposable or rechargeable battery. The rechargeable battery may also be coupled to the peripheral device connection port to receive a charging current from a source external to the mobile device 800.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, NAND FLASH, NOR FLASH, M-RAM, P-RAM, R-RAM, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments illustrated herein but is to be accorded the widest scope consistent with the following claims and the principles and novel features disclosed herein.

What is claimed is:

1. A method of operating a computing device, comprising:
   determining an expense metric value based on a combination of a size value, a power consumption value, and a boot time value;
   determining whether a software application program is a candidate for an enhanced memory mode based on the expense metric value;
   in response to determining that the software application program is a candidate for the enhanced memory mode:
      loading the software application program into non-volatile random-access memory (NVRAM); and
      setting an enhanced memory mode indicator operable to enable a subsequent boot of the computing device in the enhanced memory mode;
   determining whether the enhanced memory mode indicator is set after rebooting the computing device; and
   operating the computing device in the enhanced memory mode by commencing execution of the software application program from the NVRAM in response to determining that the enhanced memory mode indicator is set.

2. The method of claim 1, further comprising:
   loading the software application program into volatile memory in response to determining that the software application program is not a candidate for the enhanced memory mode; and
   commencing execution of the software application program from the volatile memory in response to determining that the enhanced memory mode indicator is not set.

3. The method of claim 1, wherein determining whether the software application program is a candidate for the enhanced memory mode based on the expense metric value further comprises:
   evaluating the software application program to generate evaluation results;
   determining whether the software application program would benefit from rapid bootup, rapid state-changes, low-power device operation, or high-speed code execution based on the evaluation results; and
   determining that the software application program is a candidate for the enhanced memory mode in response to determining that the software application program would benefit from rapid bootup, rapid state-changes, low-power device operation, or high-speed code execution.

4. The method of claim 1, wherein determining whether the software application program is a candidate for the enhanced memory mode based on the expense metric value further comprises:
   determining the size value for the software application program;
   determining the power consumption value for the software application program;
   determining the boot time value for the software application program;
   determining whether the expense metric value exceeds a threshold value;
   determining that the software application program is not a candidate for the enhanced memory mode in response to determining that the expense metric value exceeds the threshold value; and
   determining that the software application program is a candidate for the enhanced memory mode in response to determining that the expense metric value does not exceed the threshold value.

5. The method of claim 1, further comprising:
   identifying a plurality of candidate software application programs;
   categorizing each of identified software application programs into one or more categories;
   determining a worthiness value for each of the identified software application programs based on the one or more categories associated with each identified software application program; and
   inserting one or more of the identified software application programs into a list of candidate software application programs based on their respective worthiness values,
   wherein determining whether the software application program is a candidate for the enhanced memory mode based on the expense metric value further comprises determining whether the software application program is a candidate for operating in the enhanced memory mode based on information included in the list of candidate software application programs.

6. The method of claim 5, wherein inserting one or more of the identified software application programs into the list of candidate software application programs based on their respective worthiness values comprises inserting the identified software application programs into an ordered list of candidate software application programs that organizes the identified software application programs based on their associated worthiness values.

7. The method of claim 5,
   wherein inserting one or more of the identified software application programs into the list of candidate software application programs based on their respective worthiness values comprises:
      determining whether the worthiness value associated with an identified software application program exceeds a threshold value; and
      inserting the identified software application program into the list of candidate software application programs in response to determining that the worthiness value associated with the identified software application program exceeds the threshold value; and
   wherein determining whether the software application program is a candidate for operating in the enhanced memory mode based on information included in the list of candidate software application programs comprises determining whether the software application program is included in the list of candidate software application programs.

8. The method of claim 1, wherein setting the enhanced memory mode indicator operable to enable the subsequent boot of the computing device in the enhanced memory mode comprises storing a flag in a non-volatile memory.

9. The method of claim 1, wherein setting the enhanced memory mode indicator operable to enable the subsequent boot of the computing device in the enhanced memory mode comprises setting one of:
   a low power mode indicator;
   a rapid boot time mode indicator;
   a rapid state-transition mode indicator; or
   a high-speed execution mode indicator.

10. The method of claim 1, wherein determining whether the enhanced memory mode indicator is set after rebooting the computing device comprises executing a trusted boot program to securely determine a presence of the enhanced memory mode indicator.

11. The method of claim 1, further comprising:
sending the enhanced memory mode indicator to a system-on-chip of the computing device from a component external to the system-on-chip.

12. The method of claim 1, further comprising:
receiving an exception indicating that the computing device should exit the enhanced memory mode; and
operating the computing device in a non-enhanced memory mode in response to receiving the exception.

13. The method of claim 1, wherein loading the software application program into the NVRAM comprises:
loading a software image from a storage memory into the NVRAM, the software image being configured to execute within the NVRAM.

14. The method of claim 1, further comprising partitioning the software application program into a plurality of software images, wherein loading the software application program into the NVRAM comprises loading a subset of the plurality of software images into the NVRAM.

15. The method of claim 14, further comprising identifying a software image in the plurality of software images that would benefit most from improvements associated with execution in NVRAM, wherein loading the subset of the plurality of software images into the NVRAM comprises loading the identified software image into the NVRAM.

16. A computing device, comprising:
a non-volatile random-access memory (NVRAM); and
a processor coupled to the NVRAM, wherein the processor is configured with processor-executable instructions to perform operations comprising:
determining an expense metric value based on a combination of a size value, a power consumption value, and a boot time value;
determining whether a software application program is a candidate for an enhanced memory mode based on the expense metric value;
in response to determining that the software application program is a candidate for the enhanced memory mode:
loading the software application program into the NVRAM; and
setting an enhanced memory mode indicator operable to enable a subsequent boot of the computing device in the enhanced memory mode;
determining whether the enhanced memory mode indicator is set after rebooting the computing device; and
operating the computing device in the enhanced memory mode by commencing execution of the software application program from the NVRAM in response to determining that the enhanced memory mode indicator is set.

17. The computing device of claim 16, wherein the processor is configured with processor-executable instructions to perform operations such that determining whether the software application program is a candidate for the enhanced memory mode based on the expense metric value further comprises:
evaluating the software application program to generate evaluation results;
determining whether the software application program would benefit from rapid bootup, rapid state-changes, low-power device operation, or high-speed code execution based on the evaluation results; and
determining that the software application program is a candidate for the enhanced memory mode in response to determining that the software application program would benefit from rapid bootup, rapid state-changes, low-power device operation, or high-speed code execution.

18. The computing device of claim 16, wherein the processor is configured with processor-executable instructions to perform operations such that determining whether the software application program is a candidate for the enhanced memory mode based on the expense metric value further comprises:
determining the size value for the software application program;
determining the power consumption value for the software application program;
determining the boot time value for the software application program;
determining whether the expense metric value exceeds a threshold value;
determining that the software application program is not a candidate for the enhanced memory mode in response to determining that the expense metric value exceeds the threshold value; and
determining that the software application program is a candidate for the enhanced memory mode in response to determining that the expense metric value does not exceed the threshold value.

19. A computing device, comprising:
means for determining an expense metric value based on a combination of a size value, a power consumption value, and a boot time value;
means for determining whether a software application program is a candidate for an enhanced memory mode based on the expense metric value;
means for loading the software application program into non-volatile random-access memory (NVRAM) and setting an enhanced memory mode indicator operable to enable a subsequent boot of the computing device in the enhanced memory mode in response to determining that the software application program is a candidate for the enhanced memory mode;
means for determining whether the enhanced memory mode indicator is set after rebooting the computing device; and
means for operating the computing device in the enhanced memory mode by commencing execution of the software application program from the NVRAM in response to determining that the enhanced memory mode indicator is set.

20. The computing device of claim 19, wherein means for determining whether the software application program is a candidate for the enhanced memory mode based on the expense metric value further comprises:
means for determining the size value for the software application program;
means for determining the power consumption value for the software application program;
means for determining the boot time value for the software application program;
means for determining whether the expense metric value exceeds a threshold value;
means for determining that the software application program is not a candidate for the enhanced memory mode in response to determining that the expense metric value exceeds the threshold value; and means for determining that the software application program is a candidate for the enhanced memory mode in response to determining that the expense metric value does not exceed the threshold value.

* * * * *